United States Patent
Bennett et al.

[11] Patent Number: 5,956,712
[45] Date of Patent: Sep. 21, 1999

[54] BYTE RANGE LOCKING IN A DISTRIBUTED ENVIRONMENT

[75] Inventors: Robert Bradley Bennett, Endwell; Brian Paul Dixon, Newark Valley; Eugene Johnson, Vestal, all of N.Y.

[73] Assignee: International Business Machines Corporation, Armonk, N.Y.

[21] Appl. No.: 08/472,153

[22] Filed: Jun. 7, 1995

[51] Int. Cl.[6] .................................................. G06F 17/30
[52] U.S. Cl. ................................ 707/8; 707/10; 707/104
[58] Field of Search .................................... 395/600, 610, 395/616, 601, 427, 425, 725, 603, 650, 604, 608, 609, 732, 187.01, 670–678; 364/200; 379/100; 370/94.1, 85.1, 85; 375/377; 707/8

[56] References Cited

U.S. PATENT DOCUMENTS

| | | | |
|---|---|---|---|
| 4,325,120 | 4/1982 | Colley et al. | 364/200 |
| 4,584,639 | 4/1986 | Hardy | 364/200 |
| 4,604,694 | 8/1986 | Hough | 364/200 |
| 4,780,821 | 10/1988 | Crossley | 364/200 |
| 4,789,982 | 12/1988 | Coden | 370/85 |
| 4,887,204 | 12/1989 | Johnson et al. | 364/200 |
| 4,888,681 | 12/1989 | Barnes et al. | 364/200 |
| 5,043,981 | 8/1991 | Firoozmand et al. | 370/85.1 |
| 5,077,658 | 12/1991 | Bendert et al. | 395/600 |
| 5,113,519 | 5/1992 | Johnson et al. | 395/600 |
| 5,151,989 | 9/1992 | Johnson et al. | 395/600 |
| 5,170,480 | 12/1992 | Mohan et al. | 395/603 |
| 5,175,851 | 12/1992 | Johnson et al. | 395/600 |
| 5,175,852 | 12/1992 | Johnson et al. | 395/600 |
| 5,202,971 | 4/1993 | Henson et al. | 395/425 |
| 5,220,657 | 6/1993 | Bly et al. | 395/425 |
| 5,226,159 | 7/1993 | Henson et al. | 395/650 |
| 5,237,614 | 8/1993 | Weiss | 380/23 |
| 5,243,596 | 9/1993 | Port et al. | 370/94.1 |
| 5,261,051 | 11/1993 | Masden et al. | 395/200 |
| 5,261,069 | 11/1993 | Wilkinson et al. | 395/425 |
| 5,280,518 | 1/1994 | Danler et al. | 379/100 |
| 5,305,440 | 4/1994 | Morgan et al. | 395/200 |
| 5,307,490 | 4/1994 | Davidson et al. | 395/650 |
| 5,339,427 | 8/1994 | Elko et al. | 395/725 |
| 5,459,862 | 10/1995 | Garliepp et al. | 707/8 |
| 5,515,537 | 5/1996 | Tavares et al. | 395/732 |
| 5,555,388 | 9/1996 | Shaughnessy | 395/427 |
| 5,638,511 | 6/1997 | Nezu | 395/187.01 |
| 5,651,037 | 7/1997 | Barrett, Jr. et al. | 375/377 |
| 5,734,898 | 3/1998 | He | 707/203 |

FOREIGN PATENT DOCUMENTS

| | | | |
|---|---|---|---|
| 1316610 | 4/1993 | Canada | G06F 15/16 |
| 0 497 022 A1 | 8/1992 | European Pat. Off. | G06F 15/40 |
| 0 566 895 A2 | 3/1993 | European Pat. Off. | G06F 15/403 |
| 2263797 | 8/1993 | United Kingdom | G06F 9/46 |
| 2269920 | 2/1994 | United Kingdom | G06F 15/403 |
| WO 91/03024 | 3/1991 | WIPO | G06F 15/403 |

*Primary Examiner*—Thomas G. Black
*Assistant Examiner*—Frantz Coby
*Attorney, Agent, or Firm*—Terrance A. Meador

[57] ABSTRACT

A client-server distributed computer processing system provides staged byte range locking with three levels of lock complexity and contention. When locking activity for a data object involves a plurality of clients, locking is managed centrally in the server operating environment. When only a single client is involved in requesting a lock on a data object such as a data file or portion of a data file, the requesting client can be permitted to manage the locking locally in the requesting client operating environment. Client-managed locking involves two stages of locking complexity on an object-by-object basis. The first stage of client locking involves only a log of current lock activity and handles relatively simple locking. When locking becomes more complex, the client locking is migrated to a second local locking stage, where more complex data structures can support lock fragmentations that affect various portions of the data object, such as partially overlapped byte ranges. Migration between the three stages of locking uses a high level interface rather than migrating implementation-dependant structures and thereby avoids implementation dependencies and local optimization restrictions. The three-stage locking scheme optimizes performance for the more common cases of lock management, where there is minimal contention and less complexity or overlap in locking scope.

36 Claims, 15 Drawing Sheets

BYTE RANGE LOCKING IN A DISTRIBUTED ENVIRONMENT

BACKGROUND OF THE INVENTION

1. Field of the Invention

This invention relates generally to distributed computer processing systems and, more particularly, to byte range locking in distributed processing systems.

2. Description of the Related Art

In a distributed processing system, a computer processor that performs a data file access management function communicates with a plurality of remote computer processors over a network. The data management computer is generally referred to as a file server (or simply a server) and the remote computer processors are generally referred to as clients. Data files are comprised of sequences or blocks of bytes and are stored in direct access storage devices connected to the server. A client requests access to a server data file when the client must read from the data file or write to the data file.

Access to the data files must be managed because, for example, potentially severe data conflicts would occur if multiple clients wrote data to data files without other clients becoming aware that data in the data files was changing, or data inconsistencies might result if multiple clients attempted to simultaneously write to the same data file. Data processing systems such as described above can operate in accordance with well-known standards such as the POSIX standard or other UNIX environments. Byte range locking is a way of managing access to server data files and can either be implemented as enforced byte range locking or as advisory byte range locking. With enforced byte range locking, a client cannot gain access to a byte range within a data file or similar data object unless the client requests and receives a lock from the server.

Write locks are exclusive, meaning that only one client at a time can write to a data file. Read locks are not exclusive, meaning that multiple clients can simultaneously be given permission to read from a data file, as long as there are no write locks on the file. With advisory byte range locking, the server parcels out locks to requesting clients, who execute read and write operations on data files while mutually respecting the locks of other clients without being bound by them, that is, without the server binding the byte range locks to file access. The present invention is described from the perspective of an advisory byte range locking system, but it should be understood to apply equally to an enforced byte range locking system. The phrase "byte range lock" is used interchangeably with "object lock" and refers to a lock that covers an entire data object, such as a data file, or any portion of the data object.

A byte range lock typically comprises a data structure or a stored value in a data structure. A lock data structure typically includes information sufficient to identify the client being given the lock, the data file for which the client has the lock, the byte range within the data file over which the lock has been granted, and the like. A client identified in a byte range lock data structure is said to have possession of that lock or to be holding the lock. Usually, the server can grant locks for byte ranges that are less than the entire length of the data file. When the byte range lock is for less than the entire data file, the byte range lock is often referred to as a partial lock. In some systems, each client can be granted a partial byte range lock so that each client can write data in a mutually exclusive byte range of the data file. In this way, dual write operations can occur without interrupting each other, and can thereby reduce client wait time for data file access.

Some byte range locking systems permit queuing of lock requests. Such queuing can eliminate the situation of requesting clients who jump ahead of others in receiving locks for contested data files, thereby assuring that locks are awarded in the sequence that lock requests arrive, without delays that can result from the retry method of handling lock contention. For example, many lock queuing systems record locks with relatively complicated data structures that permit overlapping byte ranges and extensive sharing of locks for concurrent data operations with multiple clients. Sharing of locks permits portions of a data file to remain exclusive while other portions of the data file are placed in contention with multiple client processes that request locks for the same byte range. To permit concurrent data operations on a data file, it is necessary to split up the range of the locks to keep track of the lock range that is not in contention separately from the lock range that is in contention. Such splitting of byte ranges for simultaneous operations are sometimes generally referred to as "slicing and dicing" operations. The slicing and dicing typically involves relatively complicated data structures for recording the respective byte range locks.

To avoid complex lock structures and queuing for locks, an alternative is to reject locks when there is contention, asking the lock requestor to retry the lock at a later time. This method allows for relatively simple lock structures because there is no need to record queued lock waiters. Management of data file access through byte range locking generally helps provide orderly servicing of client requests, but with the retry method some problems can remain. For example, if a client submits a lock request for access to a data file that is currently locked by another client, the server might respond to the requesting client with an instruction to submit the request again at a later time. That is, the server instructs the client to make a retry later, when the current lock holding client might be finished with its data operations. Unfortunately, the requesting client may find that other clients have submitted lock requests to the server for the same data file while the requesting client was waiting to make its retry and also may find that these other clients have already received their locks. Thus, the later-requesting clients will have effectively jumped ahead of the originally requesting client. This type of situation can undesirably add to the waiting time before a client receives a requested lock. Even if the lock sequence problem is otherwise solved so that locks are awarded in chronological sequence, lock granting may still be saddled with delays. These delays are encountered when the lock becomes available before the requester's lock retry is initiated.

In systems that use server-based locking, a component of client waiting time for locks is client-to-server communication, whereby a client must request a lock from the server, wait for the response, perform any retry if applicable, and then perform the data operation after finally receiving the lock.

One way of reducing the client-to-server communication load is to permit local, client-based management of locks by recording the locks in a client lock cache. A client lock management scheme permits individual clients in a distributed system to record locks in their own respective environments. In client-based locking, locks are recorded using lock data structures that contain information sufficient to identify the client process being given the lock, the data file for which the client process has the lock, and the byte range over which the lock has been granted. Client-based locking generally provides fast lock response times for clients because a client does not have to communicate with the server for locks and unlocks on a data file, except for the initial communication to establish local locking by the client. Some inefficiencies, however, remain with client-based locking.

With client-based locking, it sometimes becomes necessary to transfer locks from a client cache back to the server. For example, if there is any contention among the clients for locks, the contention must be resolved by the server. That is, if multiple clients request access to the same data file or to overlapping portions of a data file and are placed in contention, the server typically recalls any byte range locks that were previously granted for that data file. Therefore, lock contention among clients triggers lock migration to the server in which locks recorded in client lock cache are transferred to the server and stored in server lock data structures. A byte range lock system in which locking is migrated from clients to server is described, for example, in U.S. Pat. No. 5,226,159 issued Jul. 6, 1993 to Henson et al. and assigned to International Business Machines Corporation (IBM Corporation).

Thus, client-based locking with client lock cache reduces the client-to-server communication load, but is less efficient at handling lock contention, overlapping byte lock ranges, or other complexities. Generally, client lock contention is avoided by using a lock retry scheme. Queuing of lock operations in the server provides the advantage of ensuring that locks are granted on a first-come, first-served basis without retry delays. The complexity of the lock data structures to support queuing, however, can be problematic. A difficulty with client-based byte range locking with queuing is that the lock data structures necessary to describe a byte range lock can be quite complex. The lock migration operations to transfer lock data structures between a remote client and the server can require complex pointer relocation steps. This complexity can be expensive to implement in terms of system resources and can be a detriment to system reliability.

From the discussion above, it should be apparent that there is a need for a processing system that provides flexible byte range locking and lock migration to a server in a distributed processing environment and provides added operational capabilities for client lock managers, thereby permitting improved lock performance, reduced waiting time for locks, and increased system operating efficiency. The present invention satisfies this need.

SUMMARY OF THE INVENTION

In accordance with the invention, a client-server distributed computer processing system provides staged locking of data objects and portions of data objects in response to the level of lock complexity and system resource limitations. One indication of lock complexity is contention for a data object in which a byte range lock is requested. Therefore, if only a single client requests a byte range lock on a data object, such as a data file or portion of a data file, then the server will permit that client to maintain the lock locally in the client environment. If the locking complexity increases, such as when more than one client requests a lock on the same data object, then the server recalls the locks for the data object and maintains server lock structures that support contention, queuing, and lock fragmentation, such as overlapping byte range locks. In addition to migrating locks in response to a server recall, clients also can voluntarily give up their local locks if a resource limitation is reached. For example, a client may exhaust available storage space in which to place lock data structures. In this way, lock management is migrated from the client environment to the server environment in response to available system resources and lock complexity.

The distributed computer processing system advantageously permits the server to respond to a client request for a byte range lock by either immediately granting the lock if no other client currently has a lock for the file or by granting a lock after lock contention is concluded. That is, the server does not respond to a client lock request with an instruction to submit a retry request at a later time. Rather, the server queues the request for the byte range. If local locking exists, the server recalls all locks involving the requested byte range before queuing the new request. This guarantees a first come, first served award for the byte range lock. The requesting client is never told to retry later, as that could provide an opportunity for other requests to supersede the earlier request. This lock management scheme avoids excessive client-server communications and extended client waiting for locks. Also, clients need not bother with submitting retry requests. This makes lock contention transparent to the clients, who receive requested byte range locks without ever being aware of lock contention.

For client managed local locking, a client maintains a client lock log to describe the local locks the client holds and to reconstruct the initial lock request for any byte range lock that is still active. When a client migrates local locks (and partial unlocks) to the server, the client uses the client lock log to reconstruct the original lock or unlock request for the data object and sends the request to the server. The server collects migration responses from the clients and records locks in its server lock structures. For server managed locking, the server lock structures may be different from the client lock structures for the same byte range lock, because the ability of the clients to reconstruct lock requests provides a high level interface that can be independent of the respective client environment data implementations. Thus, it is unnecessary to move relatively complex lock-describing data structures between a client and the server when locks are migrated from the client to the server.

In one aspect of the invention, client-managed locking involves two stages of locking complexity on an object-by-object basis. The first stage of client locking involves only the client lock log and handles relatively simple locking. When locking becomes more complex, the client locking is migrated to a second local locking stage, where more complex client data structures can support queuing and lock fragmentations that affect various portions of the data object, such as partially overlapped byte ranges. The more complicated client lock data structures include pointers and the like necessary to identify the client processes requesting locks and the data objects or portions thereof for which locks have been granted and for which queuing exists. The client lock data structures can be different from the server lock structures. Migration between the three stages of locking uses a high level interface rather than migrating implementation-dependant structures and thereby avoids implementation dependencies and local optimization restrictions. The three-stage locking scheme optimizes performance for the more common cases of lock management, where there is minimal contention and less complexity or overlap in locking scope.

In another aspect of the invention, the distributed computer processing system supports a variety of lock management progressions between the two-level client lock management and the server lock management. For example, lock management can be performed solely by the server under some circumstances, with no client-managed local lock cache at all. Lock management alternatively can be performed first by the first stage client lock log mechanism described above, then by the second stage client lock structure mechanism when warranted by lock complexity, followed by server managed locking if contention occurs. Alternatively, lock management can begin with the first stage local locking based on the client lock log and then migrate to server lock management, or lock management can begin with the second stage local locking based on the client lock structure before migration to server locking.

In yet another aspect of the invention, all of the lock management options described are supported on a client level and data object level, in addition to globally. That is, a client through which a byte range lock is requested can ask the server to grant local lock management privileges for all requests from that client, or can request local locking only for the particular data object for which a lock is requested. Thus, one client may choose to do local locking for selected data objects but not for others, and another client might elect not to do any local lock caching at all. Thus, different clients can elect different local locking schemes. Alternatively, a global, system-wide lock management rule can be enforced. In a related aspect of the invention, the server can determine if the locking conditions are sufficiently complex that it should deny a client request for local lock management.

Other features and advantages of the present invention should be apparent from the following description of the preferred embodiment, which illustrates, by way of example, the principles of the invention.

DESCRIPTION OF THE PREFERRED EMBODIMENT

Figure 1:
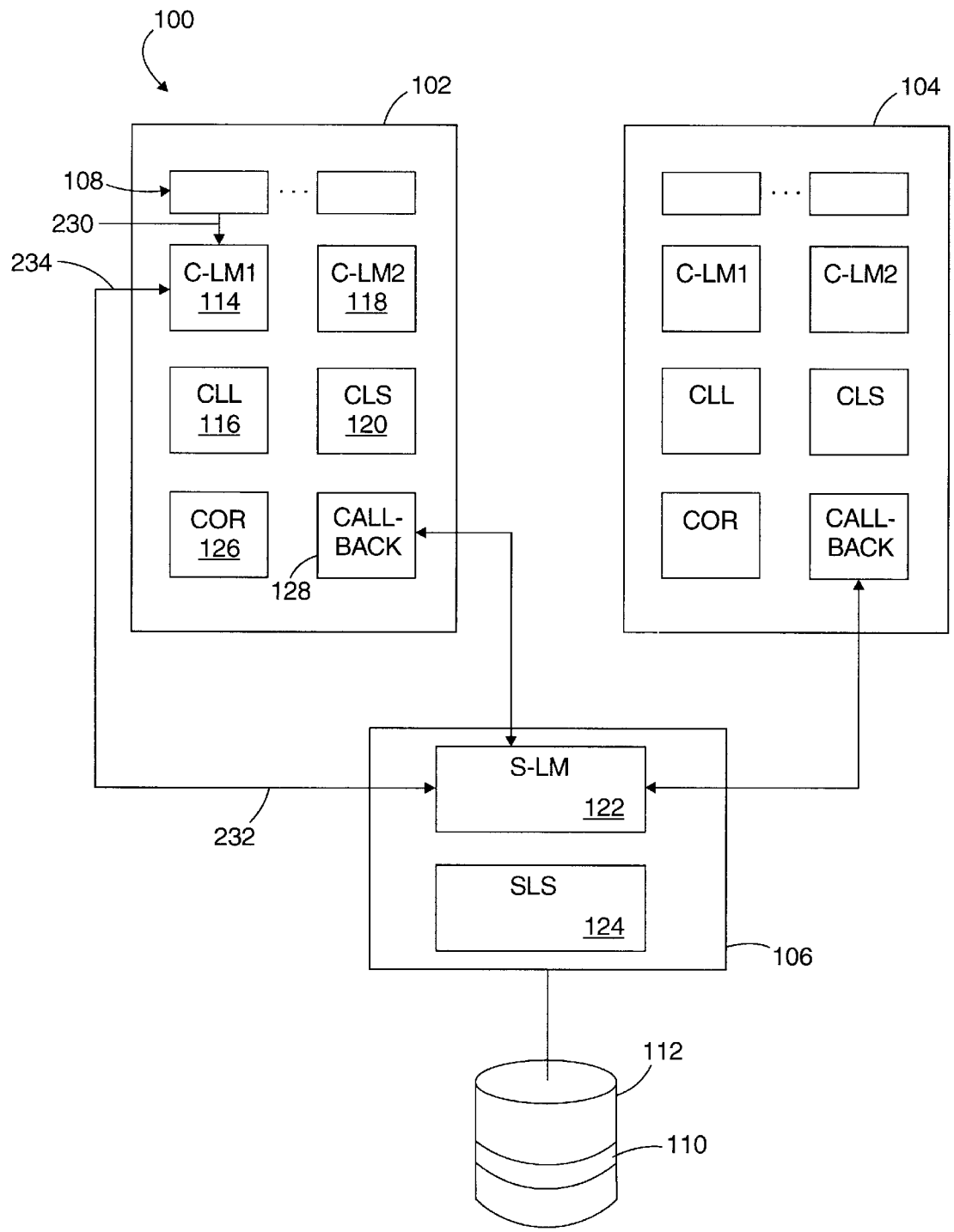
FIG. 1 is a functional block diagram of a computer processing system constructed in accordance with the present invention.

FIG. 1 shows a functional block diagram representation of the distributed data processing system 100 in which remote clients 102, 104 communicate with a server 106. Computer processes, data structures, and operating modules are represented by blocks within each of the respective clients and server. In the first client 102, for example, multiple processes 108 within the client environment request byte range locks on data lock objects. The data lock objects comprise byte ranges within data files 110 (or can encompass entire data files) that are stored in one or more direct access storage devices (DASD) 112. In accordance with the preferred embodiment of the invention, byte range locks are granted to client processes and are recorded according to one of three schemes, either (1) by a first client lock manager 114 recording in a client lock log 116, (2) by a second client lock manager 118 recording in a more complex client lock structure 120, or (3) by a server lock manager 122 recording in a server lock structure 124. The specific lock manager used for recording a byte range lock is dynamically determined in accordance with system operating conditions, including the relative complexity of the locking circumstances and whether there is contention for locks. For example, when only a single client is involved in locking a data file, byte range locks for the file are maintained in the client requesting the lock. When multiple clients request locks for byte ranges within the same data file, lock migration to the server takes place. The server is a common control point for handling lock contention between multiple clients. In this way, less complex and less contentious locking conditions can be managed by a less complex and faster performing method of lock recording and management. More complex and more contentious locking conditions can be managed by a more complicated method of lock recording and management.

Figure 2:
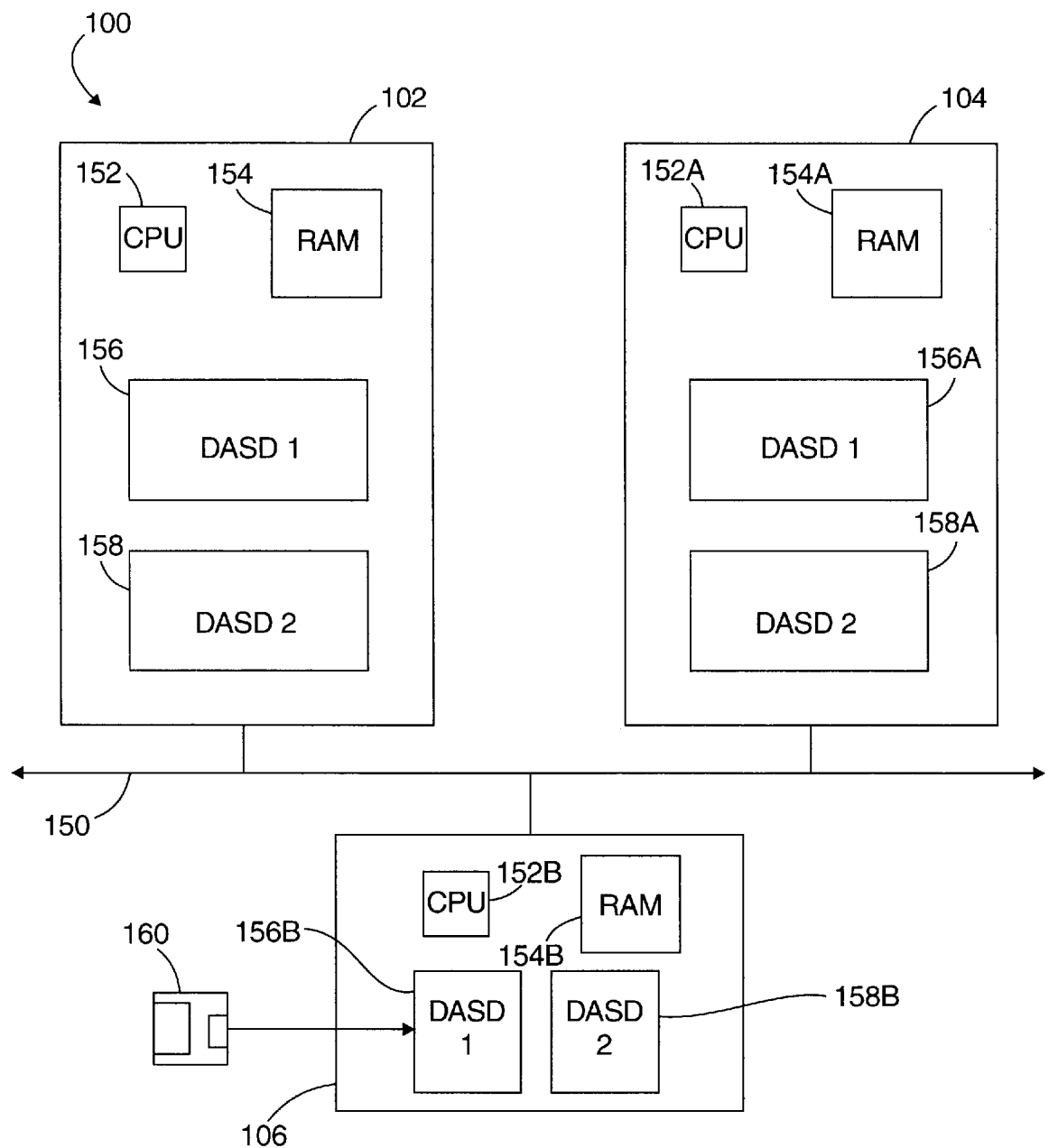
FIG. 2 is a block diagram that shows the construction of the computer processing system illustrated in FIG. 1.

In FIG. 1 and FIG. 2, the two clients illustrated perform similar functions and has similar constructions. Like reference numerals should be understood to refer to like functions and structures. Thus, operating descriptions that are described with reference to the first client 102 should be understood to also apply to the second client 104, unless otherwise noted.

In the preferred embodiment, a byte range lock request that does not overlap with any previously granted lock is managed by the first client lock manager 114, which is labelled C-LM1 in FIG. 1. The designation "C-LM1" will be used interchangeably with "first client lock manager". Any byte range lock request that specifies a byte range that overlaps with a previously granted lock results in lock management by the second client lock manager 118, which is labelled C-LM2 in FIG. 1. The designation "C-LM2" will be used interchangeably with "second client lock manager". The client lock log 116 (labelled "CLL" in FIG. 1) is a relatively simple data structure comprising a table with a different row for each lock or unlock. The client lock structure 120 (labelled "CLS" in FIG. 1) is a relatively complicated data structure that includes pointers and chained lists. Such data structures are commonly used for byte range locks and therefore the configuration of the CLS will be understood by those skilled in the art without further explanation.

The lock migration status for an object that can be locked is maintained in a client object record 126 (labelled "COR" in FIG. 1). The COR is a data structure in a client comprising a set of records, each having information about a data lock object that is currently active for the client. Such information includes a migrate flag and a CCL permission (local locking) flag, described further below. There is one COR data record for each lockable object. The COR represents the current state of lock migration and lock caching for a data object.

Thus, when lock migration occurs from C-LM1 to C-LM2, an appropriate change is made to the COR for the data lock object involved by setting a migrate flag on. Also, when local cache locking is in effect, the CCL permission flag is set on.

In the preferred embodiment, lock management is performed by the server lock manager 122 in the following cases: (1) a client does not request client managed (also referred to as client cached) locking, (2) a lock request is for a data lock object for which another client lock already exists, where the other client is doing local locking for the data object, or (3) a lock request is for a data lock object for which lock management is already being performed by the server. The server lock manager 122 is labelled S-LM in FIG. 1, which designation will be used interchangeably with "server lock manager". The server lock manager will command lock migration (that is, recall or call back the locks) from the clients to itself, file by file, when the server is to take over lock management from one or more of the clients. For this purpose, each client includes a callback processor 128 that receives lock callback commands from the server and returns appropriate entries in the CLL. The server receives the entries and places them in its server lock structure (SLS) 124.

It should be understood that the three-stage lock management scheme of the preferred embodiment is optional. That is, lock migration can occur either from the first client lock manager C-LM1 to the second client lock manager C-LM2, from C-LM1 to the server lock manager S-LM, or from C-LM2 to S-LM, or a combination such as C-LM1 to S-LM. Alternatively, all locking can be managed by the server alone. Lock migration can occur globally for all clients in the distributed system 100, or only for all lock requests within a single client environment, or can occur on a case-by-case basis in response to the locking environment for a particular data lock object. Thus, the present invention provides a computer data processing system having a more flexible method of lock migration from clients to server that permits optimized lock managers in both the client and server operating environments.

FIG. 2 shows the structural components of the distributed computer system 100 of FIG. 1 and shows that the clients 102, 104 are connected to the server 106 over a network 150. FIG. 2 also shows that each client includes a central processor unit (CPU) 152 and a random access memory (RAM) 154. The CPU retrieves program operating instructions from a program memory section of the RAM and causes execution of the instructions so as to provide the client environment in accordance with the functional illustration of FIG. 1 and as described herein. Each client optionally includes one or more direct access storage devices, shown in FIG. 2 as a first device 156 labelled DASD 1 and a second device 158 labelled DASD 2. The DASD devices can comprise, for example, a floppy disk drive and a hard disk drive.

The second client machine 104 illustrated has a similar structure as the first client machine 102. Such similar construction is indicated by reference numerals within the client block 104 having an "a" suffix. Thus, the client 104 has a CPU 152a, RAM 154a, and direct access storage devices 156a and 158a. Similarly, the server 106 has structure corresponding to the elements shown for the client 102, which are indicated by reference numerals within the server block having a "b" suffix. Thus, the server has a CPU 152b, RAM 154b, and direct access storage devices 156b and 158b. It should be understood that a reference to one of the elements without a suffix includes that element generally, as embodied in any or all of the machines 102, 104, 106 unless indicated otherwise.

In the preferred embodiment, the server 106 and clients 102, 104 are virtual machine environments in one or more mainframe "VM/ESA" systems available from IBM Corporation. They communicate using one of several network communication facilities of "VM/ESA." In such a case, the CPU, RAM, and DASD are all virtual system entities maintained by the "VM/ESA" system. Alternatively, the CPU 152 can comprise a processor such as those commonly used to implement the IBM Corporation "Personal Computer" ("IBM PC") and IBM PC-compatible machines. The CPU also can comprise other processors such as used in the Apple Computer Corporation "MacIntosh" line of computers or other more powerful processors commonly used for workstations and the like. In such systems, the server CPU 152b generally is at least as powerful as one of the client CPUs.

The client processes 108 illustrated in FIG. 1 comprise sets of operating instructions that are retrieved from the RAM 154 and executed according to the CPU 152. The operating instructions for the processes 108, as well as the operating instructions for the other functions illustrated in FIG. 1 such as the client lock managers C-LM1 and C-LM2, server lock manager S-LM 122, and the callback processor 128, can be stored on a program storage device having digital storage media, such as a floppy disk 160, and can be read from the program storage device into the program memory of the RAM under control of the CPU by a floppy disk drive, such as the "DASD 1" device 156b of the server 106. The operating instructions can be stored on other suitable program storage devices, such as optical disks and memory cards, in which case the server can be provided with a suitable DASD machine to read the stored instructions such that they can be executed by the CPU 152b. In this way, the program storage device 160 tangibly embodies the program operating instructions that are executed by the CPU.

Figure 3:
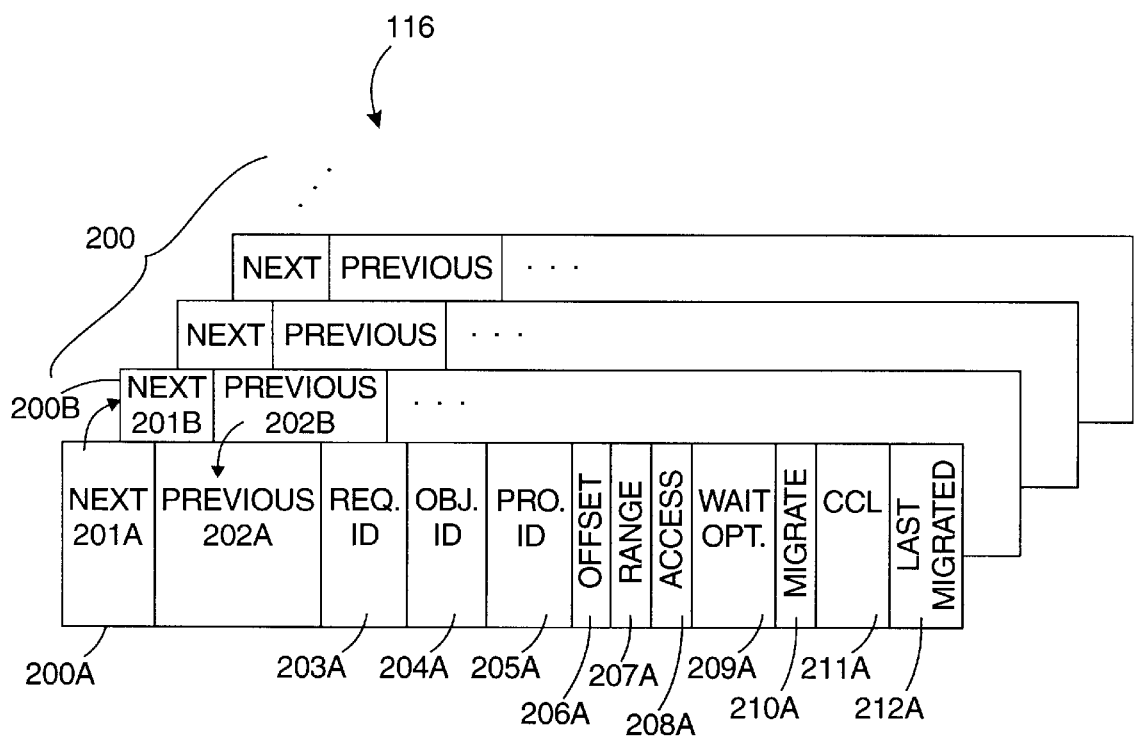
FIG. 3 is a representation of the client lock log (CLL) data structure stored in one of the remote clients illustrated in FIG. 2.

As noted above, client-managed locking by the first lock manager C-LM1 114 involves storing lock data into the CLL 116. FIG. 3 is a representation of the CLL that illustrates the type of data contained in the CLL. As shown in FIG. 3, the CLL comprises a data table in which each one of the rows 200 represents a byte range lock on a different lock range for a lock object. In the preferred embodiment, client cached locking based solely on the CLL is used only when no overlap exists for byte range locks in a single data file. That is, when a client obtains a lock for a byte range within a data file, then that lock results in an entry in the CLL of the client having the lock. If any other client process requests a lock for an overlapping byte range within the same data file, even within the same client environment, then the CLL locking cannot be used. It should be understood that, if desired, more liberal locking rules for CLL-based locking could be used.

Thus, FIG. 3 shows that a first row 200a of the CLL 116 includes a next entry field 201a that points to the next entry field 201b in the succeeding row 200b. Similarly, each row 200b includes a previous entry field 202b that points to the previous entry field 202a in the preceding row 200a. The remaining data fields of the row 200a include a request identification field 203a that identifies a process request, a lock object identification field 204a that identifies the data object for which a lock or unlock request is sought, and a process identification field 205a that identifies the client process making the request. Additional fields in a row include an offset field 206a that specifies the byte range offset of the request, a range field 207a that specifies the length of the byte range, and an access type parameter 208a that specifies a predetermined access mode (such as shared read locks or non-shared write locks) for the lock object.

The last four fields of the CLL row are copied from the lock request itself as supplied by the client when migration to the server occurs. A wait option field 209a permits a requestor to indicate it does not want to wait for a lock and is applicable for non-migration requests. That is, the requester process prefers to receive a "lock failed" indication if it cannot immediately obtain a lock without waiting. The next field in the row is a migrate flag 210a to indicate at the time of migration of locks to the server that the request is a migration request. Next is a CLL privilege request field 211a that pertains to non-migrated lock requests to indicate if the requesting process desires client cached locking. The last migrated indicator field 212a indicates that a migrate response is the last request for a data lock object whose locks are being migrated.

Figure 4:
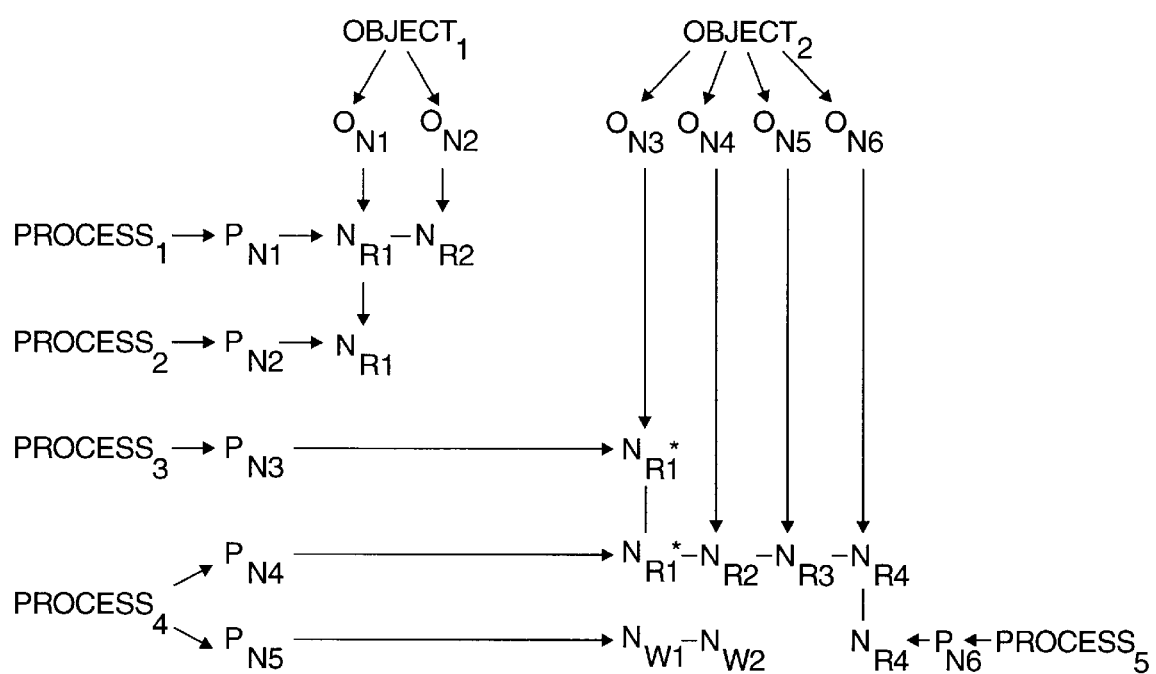
FIG. 4 is a representation of the client lock structure (CLS) stored in the client illustrated in FIG. 2.

Client managed locking by the second client lock manager C-LM2 118 involves the client lock structure CLS 120. The CLS contains data structures including pointers and chained lists that define byte range locks having a relatively great deal of flexibility. Such data structures are commonly used, for example, with conventional byte range lock management methods such as described in the Background section above, particularly where lock contention and queuing are supported. FIG. 4 is a representation of the client lock structure stored in the CLS and is meant to convey the complexity of the CLS data. In FIG. 4, two data objects comprising stored files are represented by $OBJECT_1$ and $OBJECT_2$ across the top of the drawing. Client processes that generate byte range locks on byte strings of the data objects are represented by $PROCESS_1$, $PROCESS_2$, $PROCESS_3$, $PROCESS_4$, AND $PROCESS_5$ along the sides of the drawing. The arrowheads and connecting lines in FIG. 4 represents binary trees, chained lists, pointers, and similar data structures.

The first data object $OBJECT_1$ includes two byte ranges $O_{N1}$ and $O_{N2}$ for which locks have been requested. The second data object $OBJECT_2$ includes four byte ranges $O_{N3}$, $O_{N4}$, $O_{N5}$, and $O_{N6}$ for which locks have been requested. The first client process $PROCESS_1$ has issued a byte range lock request represented by $P_{N1}$, the second process $PROCESS_2$ has issued a lock request represented by $P_{N2}$, and the third process $PROCESS_3$ has issued a lock request represented by $P_{N3}$. The fourth process $PROCESS_4$ has issued two lock requests represented as $P_{N4}$ and $P_{N5}$, and the fifth process $PROCESS_5$ has issued a lock request represented as $P_{N6}$. The intersection of the byte range lock request arrowheads and the data object arrowheads define byte range locks such that the type of lock, overlapping lock ranges, and lock request queuing can be discerned.

For example, the lock request $P_{N1}$ has been granted a read level byte range lock corresponding to the byte string $O_{N1}$ within $OBJECT_1$ and the lock request $P_{N2}$ has been granted a read level lock corresponding to the byte string $O_{N2}$ within $OBJECT_1$. The recording of the lock covering the first byte range is represented by $N_{R1}$ and the recording of the lock covering the second byte range is represented by $N_{R2}$. Thus, the two processes $PROCESS_1$ and $PROCESS_2$ can share read locks to a data object. It should be noted that, before $P_{N1}$ and $P_{N2}$ both requested locks to the same data object, $P_{N1}$ could have been granted a single byte range lock that covered both $O_{N1\ and\ ON2}$ with a single $N_R$ recording of the lock. Such piecemeal dividing of lock ranges according to data objects and requesting processes is generally referred to as slicing and dicing.

FIG. 4 also shows that the lock request process called $P_{N4}$ of client $PROCESS_4$ requested a byte range lock for a read operation covering the data object $OBJECT_2$ and, specifically, the byte range defined by $N_{R1}-N_{R2}-N_{R3}-N_{R4}$. It also is clear from FIG. 4 that the lock request process called $P_{N3}$ of $PROCESS_3$ requested a read lock on the first byte range, identified as $N_{R1}$, that also was requested by $P_{N4}$ and the process called $P_{N5}$ of $PROCESS_4$ requested a write lock on the first two byte ranges, identified as $N_{W1}-N_{W2}$. The superscript asterisk (*) for the two read locks from $P_{N3}$ and $P_{N4}$ indicate that these otherwise concurrent read operations must wait until the earlier write operation of $P_{N5}$ is completed before their locks will be granted. Finally, FIG. 4 shows that a process $P_{N6}$ of $PROCESS_5$ has requested a read lock over the last byte range, identified as $N_{R4}$. Thus, it should be apparent from FIG. 4 that the lock request process $P_{N4}$ initially could have held a single lock range that covered the complete range spanning $O_{N3}$, $O_{N4}$, $O_{N5}$, and $O_{N6}$ but that this lock range was eventually sliced and diced into four sub-ranges due to contention and queuing from lock requests by the lock request processes $P_{N3}$, $P_{N5}$, and $P_{N6}$.

The type of information associated with each type of data structure in the client lock structures (CLS) illustrates the complexity involved. The $P_N$ lock request information, for example, includes a binary search key identifier that identifies the process or thread requesting a lock, the data object being locked, and the beginning range of the requested lock. The $P_N$ information also includes an end value that defines the ending byte range of the requested lock, a wait flag to indicate the selected lock wait option, a wait token for queuing and contention purposes, and pointers to the requesting process $PROCESS_X$ and to the lock record $N_R$ or $N_W$. The $O_N$ byte string information includes a key identifier record that identifies the range of the requested lock interval and also includes pointers to the lock record $N_R$ or $N_W$ and to the lock object $OBJECT_X$. Each of the lock records $N_R$ and $N_W$ include pointers that indicate relative location that are analogous to up, down, left, and right in FIG. 4 and also include pointers to the $P_N$ lock request information and the $O_N$ byte string information, as well as data relating to the access mode (read or write) and other data processing flags dependant on the system implementation.

It should be clear from the discussion above that the client lock structures (CLS) are rather complex, especially in comparison to the client lock log (CLL). Those skilled in the art will recognize that data structures such as the CLS described above are commonly used for lock managers. Attempting to migrate byte range locks from one operating environment to another by copying such lock structures between environments would require a great deal of pointer relocation operations and copying of data structures. Such operations are extremely prone to error and costly to implement. Such operations also require the same implementation between client and server. The distributed computer processing system illustrated in the drawings and described herein avoids such pitfalls by using the client lock log (CLL) to re-create the original client lock request, enabling the server to independently create the lock structures it needs to support server lock management. Moreover, the scheme described above provides a relatively high-level interface for lock migration that is independent of data implementation restrictions for the respective client environments. In the preferred embodiment the server lock structures (SLS) created by the server have the same construction as the client lock structures, but the two types of lock structures also could have different constructions that are suited to their different implementations, as dictated by the system implementation.

Figure 5:
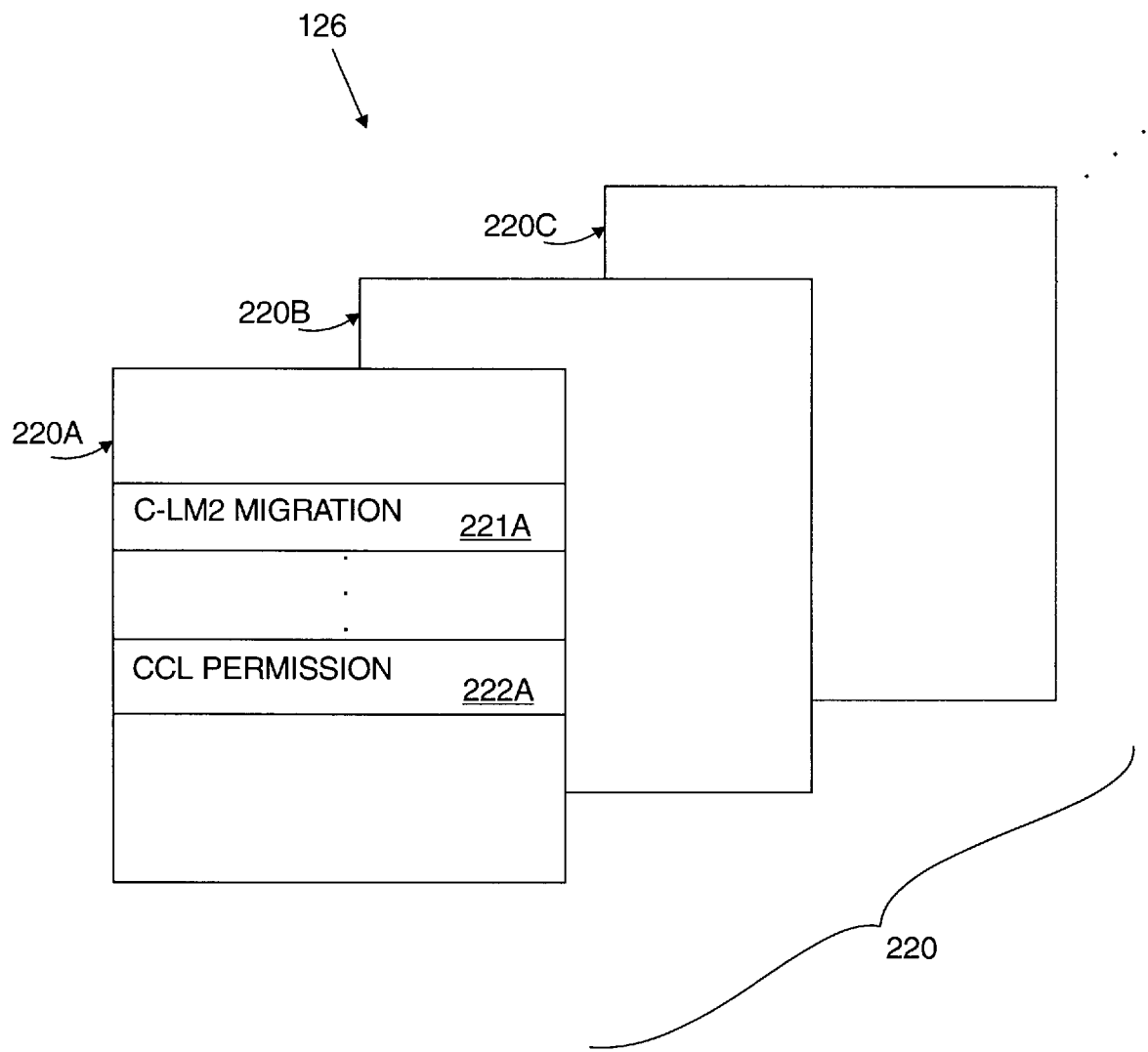
FIG. 5 is a representation of the client object record (COR) data structure stored in the client illustrated in FIG. 2.

As noted above, locks granted to client processes are recorded in the client object record COR 126. FIG. 5 is a representation of the COR that illustrates the type of data contained in the table. As shown in FIG. 5, the COR comprises a group of records 220, each of which 220a, 220b, 220c, . . . refers to a different lock object. As indicated in FIG. 5, a COR record 220a includes a "Stage Two" migration indicator field 221a that can be set to indicate migration from C-LM1 to C-LM2 has occurred and also includes a "CCL Permission" indicator field 222a that can be set to indicate that CCL permission was granted by the server.

In accordance with the invention, the selection between the alternative lock management schemes can be selected on the basis of each data lock object type or instance. As noted above, in the illustrated system 100 migration from C-LM1 to C-LM2 occurs as soon as there is contention for the same byte range of a lock object. Alternative lock migration schemes will occur to those skilled in the art.

For example, a client might request local lock management up to some resource capability such as a storage limit for maintaining locks in the client lock log or according to the number of open files in that client environment. When such resource capabilities are reached, the client might elect to send all lock requests from its subject client processes to the file server or might elect to send all future lock requests to the file server. Those skilled in the art will understand how to select between the various schemes in accordance with a particular implementation of a data processing system without further explanation.

Local lock management by a client begins when there is a lock request for a byte range by a process in a client environment. In FIG. 1, the lock request from one of the processes 108 to the first client lock manager C-LM1 is represented by an arrow marked 230. In accordance with the invention, the lock request is forwarded from the client lock manager to the server 106. The sending of the lock to the server is represented by the arrow marked 232. In the preferred embodiment, the requesting client can optionally request that lock management be maintained locally. This is referred to as client cached locking, or CCL. When the server receives such a request for client-cached locking, the server responds either by returning CCL permission, instead of recording a lock for the requesting client process in the SLS 124, or by rejecting CCL permission and recording the lock in the server SLS.

The granting of CCL permission by the server 106 is represented in FIG. 1 by the arrow marked 234. The server grants CCL permission when no other client holds a lock for the data file that is the data file of the lock request. When the server rejects the CCL request, it calls back any lock for the subject data file that might have been granted to another client 104 connected to the server. The server denies CCL permission when locking exists for the requested data file in the SLS 124, or if CCL permission for the data object has already been granted to a different client and that client has active locks for that object. If a client 104 has CCL permission recorded in the COR 126, but that client has no active locks for the object, then the client responds to a server callback by giving up CCL permission without migrating locks. In this case, the server then can give CCL permission for the file to the newly requesting client.

When CCL permission is requested by a client and is granted by the server 106, then the requesting client can select either or both of the local locking management schemes described above. In the preferred embodiment, a client 102 that is granted a lock records current and subsequent lock and unlock requests in its client lock log CLL 116. Each entry in the CLL includes information that is necessary to recreate the original lock request at a later time, should it become necessary to migrate the lock or unlock request to the server or, optionally, to the second lock manager C-LM2. Next, the lock manager deletes any previous lock request entries in the CLL when a current unlock request cancels such a previous lock request for the same data file. This action is taken to minimize the number of CLL entries and to avoid future migration of such mutually cancelling log entries.

The lock manager C-LM1 optionally modifies the previous lock entry in the CLL to reduce or split the range or scope of the entry on the basis of a current unlock request for the object, for the same reasons as cited above.

Next, the client lock manager C-LM1 114 optionally migrates the lock and unlock entries for a data lock object in the CLL 116 to the second client lock manager C-LM2 118. The C-LM2 records locks, unlocks, and client processes waiting for locks via the CLS 120 in the client environment. This migration is represented in FIG. 1 by the arrow marked 136.

As noted above, migration of locking from CLL to the CLS occurs when the limit of complexity or contentions, defined by the particular implementation rules for the first client lock manager C-LM1, is reached for a data lock object. An example of such a limitation occurs when there is contention for a byte range of a data file that otherwise would cause queuing for that portion of the data file to occur. Migration also may occur in response to excessive splitting of data files such as caused by requests for locks having overlapping byte ranges. When migration from the first lock manager C-LM1 to the second lock manager C-LM2 occurs, the CLL entry for data files whose locks are being migrated are not deleted from the CLL but instead are retained for use in possible future migration to the server. Therefore, when C-LM1 to C-LM2 migration occurs, the client object record COR 130 within the client environment is marked or flagged to indicate that local migration from the first lock manager to the second lock manager has occurred.

The first client lock manager C-LM1 114 can migrate all of the CLL entries for a data file, chronologically one at a time, using lock and unlock migration requests to the server 106. The same holds true for C-LM2 118 if lock migration has taken place. Alternatively, the client 102 can send groups of such entries to the server. Such migration occurs when the client-cached locking (CCL) privilege for the data file in question is called back by the server or when resource limitations are reached in the client that require such migration. The last such client migration request sent to the server includes an indicator (field 212a in the CLL 116) that the migration for the data file in question has been completed. The corresponding wait option field 209a and CCL permission field 211a values also are set, as appropriate. That is, the wait option is on and the CCL permission is set off. When such migration is completed, the C-LM1 removes the entries in the CLL for the migrated data file. If there are CLS entries in the client environment that also are active for the data file, this fact will be recorded as indicated by the COR 126 for that data file. If the COR indicates an active client lock structure for the data file, then the C-LM1 sends a request to the C-LM2 to purge all recorded lock activity in the CLS for the effected data file.

The first client lock manager C-LM1 scheme does not have to be used and instead the second client lock manager C-LM2 can be used. If only the second client lock manager is used, to the exclusion of the first client lock manager, then current and subsequent lock and unlock requests from client processes 108 in the client environment are recorded as entries in the CLL 116 by C-LM2, including information necessary for recreating the original request at a later time, should it become necessary to migrate the lock or unlock request to the server 106. The second client lock manager can migrate all of the CLL entries for a data lock object, chronologically one at a time, using lock and unlock migration requests sent to the server. The remaining lock processing steps are similar to the steps described above for the first client lock manager, except that they are performed by the second lock manager.

The server lock manager S-LM 122 accepts lock requests and determines whether or not a received request is a lock migration response to a callback from the server 106. If a current lock request is not a lock migration response, and CCL permission is requested, then CCL permission is granted instead of recording the locks in the server when: (1) CCL permission has not been granted to another client for the data object being locked, or CCL permission has been granted to another client but when it is called back the server finds that no locks are migrated, and (2) no locks exist in the server. If these conditions are not met, the lock is queued or recorded in the server and CCL permission is denied. If a current request is a lock migration response, the locks are recorded in the server. Where queuing is necessary, there may be a wait condition for the originating client process. A response is sent to the requestor at the time the lock request is satisfied or when CCL permission is granted.

The operation of the client machines 102, 104 will be better understood with reference to the flow diagrams of FIGS. 6–10 and the pseudocode listings of Tables 1–5 below. Those skilled in the art will appreciate that the pseudocode represents a high-level description of the programming instructions executed by the client CPU and can be depicted by the corresponding flow diagrams. In the pseudocode, line numbers are included along the left edge of each table for ease of reference. Parenthetical numerical references in the pseudocode are to blocks of related code and generally define beginning and ending lines of loops, such as Begin . . . End loops, If-Else-Endif loops, Do-Enddo loops, and the like. Those skilled in the art also will appreciate that the flow diagrams represent operating steps specified by appropriate programming instructions, which are stored in the client RAM and can be executed by the client CPU, and which can be created in view of the operating description and drawings herein.

The operating steps performed by a client are represented in the flow diagrams of FIGS. 6 through 10. Client processing begins with a request from one of the client processes, as indicated by the flow diagram box numbered 302 in FIG. 6. The request can be for a lock operation or for an unlock operation. This is reflected in line 100 of the pseudocode of Table 1. Line 101 of the table is a reference to the fact that the three-stage locking is being described, wherein lock management is shifted among C-ML1, C-LM2, and S-LM. Request processing begins with an initialization step in which lock complexity is determined, represented by the flow diagram box numbered 304 and line 102 of Table 1. In the preferred embodiment, the client determines its operating state by checking a state variable. The state variable (called STATE in the tables) indicates that either initialization, client locking with the CLL, C-LM2 managed locking, or S-LM locking should occur.

Figure 6:
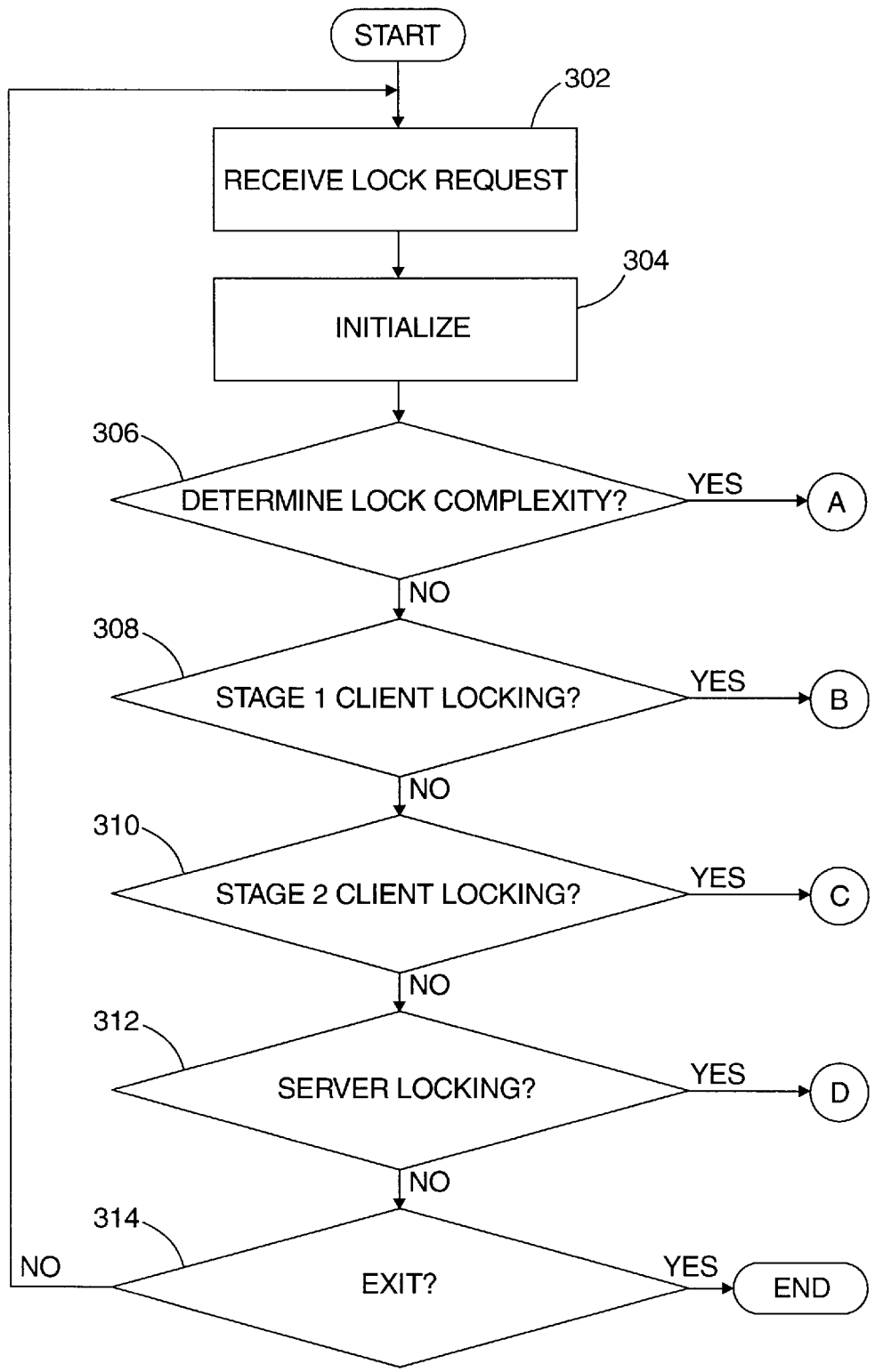
FIG. 6 is a flow diagram that represents the operating steps performed by the remote clients illustrated in FIG. 2 in response to a request from a client process.
Figure 7:
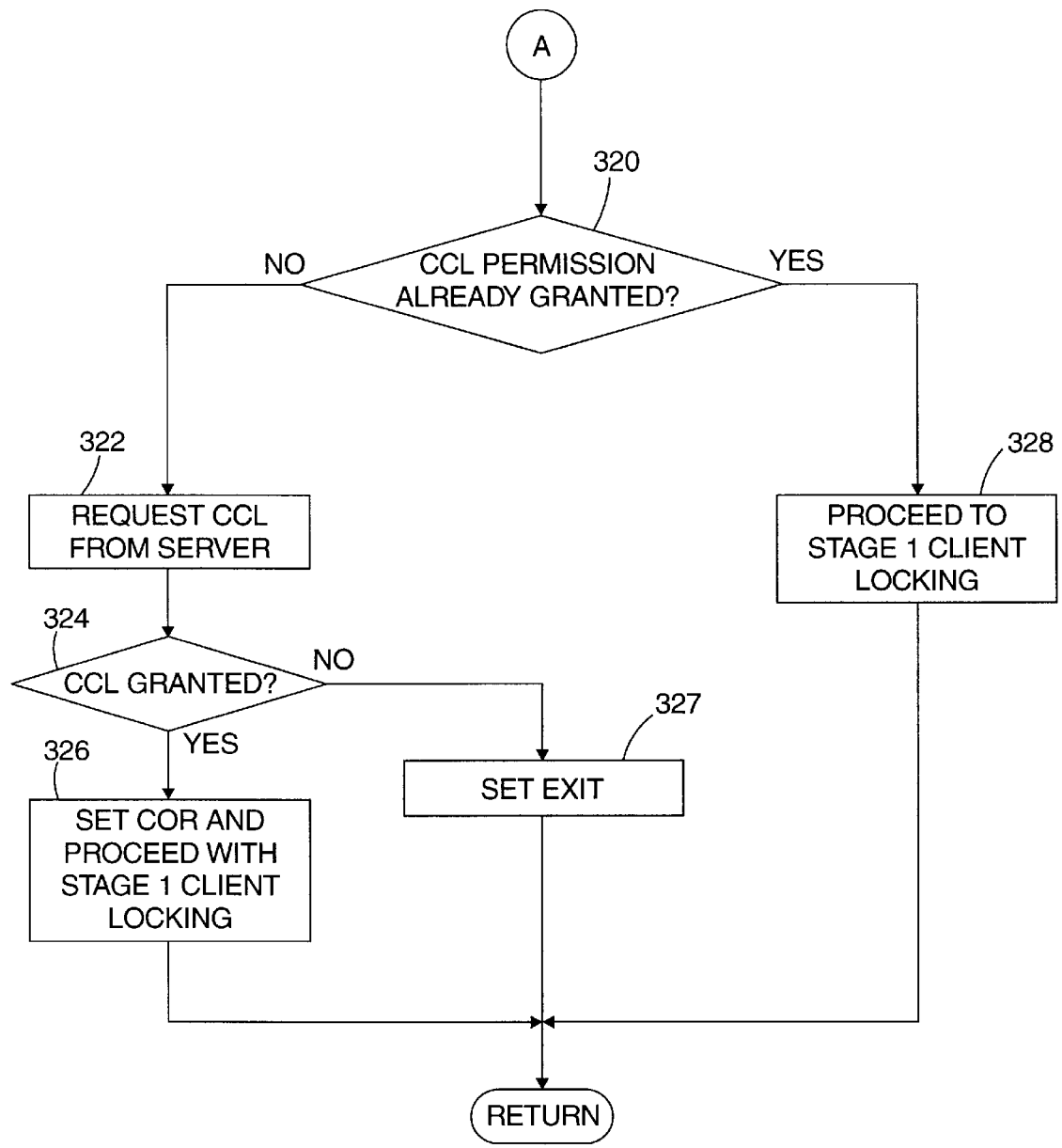
FIG. 7 is a flow diagram that represents initialization processing steps performed by the remote clients illustrated in FIG. 2.

Thus, as indicated in FIG. 6, if the client state is for initialization and lock complexity determination, then processing proceeds at the decision box numbered 306 to the off-page connector marked A (see FIG. 7). If the client state indicates that Stage 1 client locking with the CLL is proper, then client processing proceeds at the decision box numbered 308 to the off-page connector marked B (see FIG. 8). If the client state indicates that lock migration to Stage 2 client locking with C-LM2 is proper, then client processing proceeds at the decision box numbered 310 to the off-page connector marked C (see FIG. 9). If the client state indicates that lock migration to the server is proper, then client processing proceeds at the decision box numbered 312 to the off-page connector marked D (see FIG. 10). Finally, if the client state calls for an exit, then at the decision box numbered 314 client processing ends. If no exit is called for, a negative outcome at the exit decision box 314, then processing continues with the next client request at the flow diagram box numbered 302. It should be clear that the pseudocode lines 103 through 108 of Table 1 (and also lines 204–206 of Table 5 below) correspond to the flow diagram boxes of FIG. 6.

TABLE 1

| | |
|---|---|
| 100 | -Begin (206) Client logic for lock and unlock requests |
| 101 | -This logic assumes that three-stage locking is selected |
| 102 | -Initialize STATE = INIT |
| 103 | -Do (205) until STATE = EXIT |
| 104 | -Casentry (204) |
| 105 | -STATE is INIT - Determine existing locking level (109) |
| 106 | -STATE is CLL (127) |
| 107 | -STATE is M-CLM2 - Migrate to C-LM2 (179) |
| 108 | -STATE is M-SLM - Migrate to S-LM (188) |

When initialization is to be executed, the client operating steps illustrated in FIG. 7 are followed (corresponding to the line numbered 109 in Table 2 below). First, the client determines if CCL permission was previously received for the lock object that is the subject of the request being processed, as represented by the decision box numbered 320 in FIG. 7 (and lines 110–112 of Table 2). If CCL permission was not previously received, a negative outcome at the decision box 320, then the client of the preferred embodiment sends a request for CCL lock management to the server, as indicated by the flow diagram box numbered 322. Next, if CCL permission was granted, an affirmative outcome at the decision box numbered 324, then a record in the COR is set to indicate such permission and the client state proceeds to Stage 1 client locking, as represented by the flow diagram box numbered 326. If CCL permission was denied, a negative outcome at the decision box 324, then the client state is set to exit. The processing of the CCL permission response corresponds to lines 116–122 of Table 2.

If CCL permission was not previously received, an affirmative outcome at the decision box numbered 320, it indicates that locks for the lock object of the request are already held by the client. Accordingly, the client state proceeds with Stage 1 client locking, as represented by the flow diagram box numbered 328 and processing returns to FIG. 6. Such processing corresponds to lines 123–126 of Table 2.

TABLE 2

| | |
|---|---|
| 109 | -Case (204) - STATE is INIT |
| 110 | -If (123) CCL permission not previously granted |
| 111 | - to this client for this lock object |
| 112 | - as recorded in the COR |
| 113 | -Send the request to the server, requesting |
| 114 | - CCL permission |
| 115 | -Wait for response |
| 116 | -If (119) response is CCL permission granted |

TABLE 2-continued

| | |
|---|---|
| 117 | -Set indicator in COR that CCL permission granted |
| 118 | -Set STATE to CLL |
| 119 | -Else (122) response is CCL permission rejected |
| 120 | -(Locking was done in the server) |
| 121 | -Set STATE to EXIT |
| 122 | -Endif (116) response is CCL permission granted |
| 123 | -Else (126) CCL permission was previously granted |
| 124 | -(Locks for this object are cached in this client) |
| 125 | -Set STATE to CLL |
| 126 | -Endif (110) CCL permission not previously granted |

Figure 8:
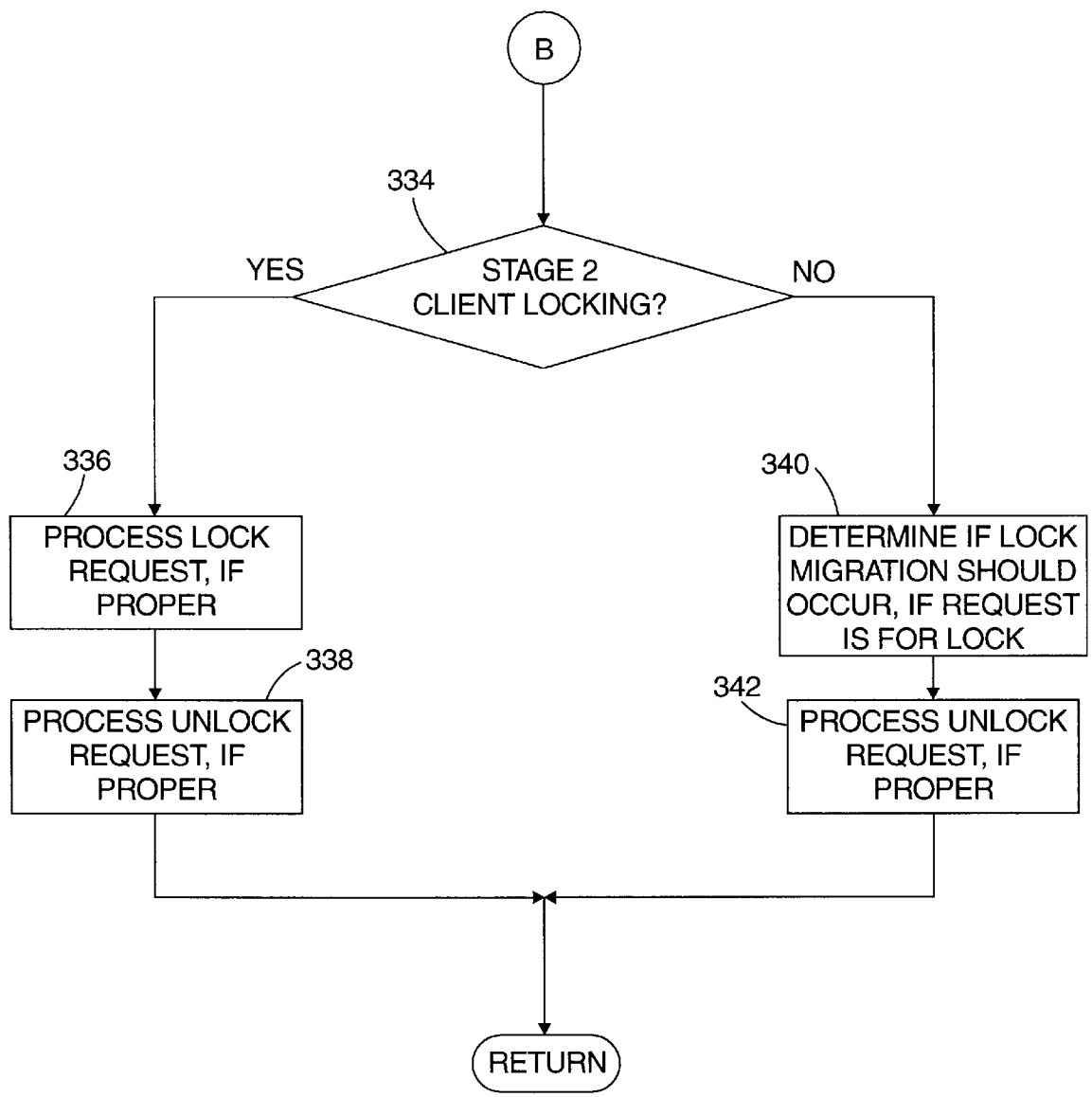
FIG. 8 is a flow diagram that represents first-stage client lock management operating steps performed by the remote clients illustrated in FIG. 2.

When Stage 1 client cached locking is to be followed using C-LM1, the client operating steps illustrated in FIG. 8 are followed (corresponding to the line numbered 127 in Table 3 of pseudocode below). First, the client determines if the data object that is the subject of the request being processed has been migrated to Stage 2 C-LM2 locking management. Such migration is indicated in the COR, which the client therefore checks, as represented by the decision box numbered 334 in FIG. 8. Next, if the current client request is a lock request, then the client adds an entry in the CLL for the lock and also invokes C-LM2 to create appropriate data structures in the CLS for the lock before the client state is set to exit and processing returns to FIG. 6. Such processing is represented by the flow diagram box numbered 336 and corresponds to lines 130–133 of Table 3. If the current client request is an unlock request, then the first client lock manager unlocks the data object by deleting the matching lock entry in the CLL and similarly unlocks in C-LM2 before setting the client state to exit and returning to FIG. 6 or, if the matching lock entry cannot be found in the CLL, the lock manager adds a CLL entry for the unlock request and executes the unlock in C-LM2 before setting the client state to exit and returning to FIG. 6. Such processing is represented by the FIG. 8 flow diagram box numbered 338 and corresponds to lines 134–146 of Table 3.

If the lock object has not been migrated to C-LM2, a negative outcome at the decision box 334, then the client determines if the current request, either a lock request or an unlock request, raises the level of locking complexity sufficiently so that lock migration should take place from C-LM1 to C-LM2. In the preferred embodiment, lock migration within the client takes place as soon as a lock request has a byte range that overlaps with another lock. Such a threshold is relatively conservative, and those skilled in the art will appreciate that other tests that more completely make use of available system resources can be used. These considerations are detailed in lines 149–157 of the Table 3 pseudocode.

Thus, if the request is for a lock, then C-LM1 adds a CLL entry for the requested lock if there are no CLL entries whose range field overlaps the range of the current request before setting the client state to exit and returning to FIG. 6 or, if there is range overlap, then C-LM1 adds a CLL entry for the requested lock and sets the client state to C-LM2 migration before returning to FIG. 6. This processing is represented by the flow diagram box numbered 340 and lines 158–166 of Table 3. If the request is for an unlock, then C-LM1 deletes the matching CLL entry, if an exact lock match is found, before setting the client state to exit and returning to FIG. 6 or, if no lock match was found, C-LM1 creates a new unlock entry in the CLL for the request, sets the client state to C-LM2 migration before returning to FIG. 6. Such processing is represented by the flow diagram box numbered 342 and corresponds to lines 167–178 of Table 3.

TABLE 3

| | |
|---|---|
| 127 | -Case (204) - STATE is CLL |
| 128 | -If (147) the current object has been migrated to C-LM2 |
| 129 | -as indicated by COR migration indicator |
| 130 | -If (134) the current request is lock |
| 131 | -Add a CLL entry for the new lock request |
| 132 | -Execute the lock in C-LM2 |
| 133 | -Set the STATE to EXIT |
| 134 | -Else (146) the current request is unlock |
| 135 | -If (140) a matching lock entry for the object |
| 136 | - exists in CLL |
| 137 | -Delete the matching lock entry in CLL |
| 138 | -Execute the unlock in C-LM2 |
| 139 | -Set STATE to EXIT |
| 140 | -Else (145) no matching lock for the object exists |
| 141 | - in CLL |
| 142 | -Add a CLL entry for the current unlock request |
| 143 | -Execute the unlock in C-LM2 |
| 144 | -Set STATE to EXIT |
| 145 | -Endif (135) a matching lock for the object exists in CLL |
| 146 | -Endif (130) the current request is unlock |
| 147 | -Else (178) the current object has not been migrated |
| 148 | - to C-LM2 |
| 149 | -(Determine if the current lock/unlock request brings |
| 150 | -the level of locking complexity for the current object |
| 151 | -to a threshold that requires migration. Where this |
| 152 | -complexity threshold is not reached, log the current |
| 153 | -request and adjust existing log entries as necessary. |
| 154 | -Where this level of complexity is reached, log the |
| 155 | -request and advance the state to cause migration. |
| 156 | -NOTE - the threshold of complexity shown here is |
| 157 | -fairly low. It could be considerably higher). |
| 158 | -If (167) the current request is a lock |
| 159 | -If (163) no locks exists in CLL that overlap |
| 160 | - the lock range |
| 161 | -Add a CLL entry for the new lock request |
| 162 | -Set the STATE to EXIT |
| 163 | -Else (166) locks exist that overlap the lock range |
| 164 | -Add a CLL entry for the new lock request |
| 165 | -Set the STATE to M-CLM2 |
| 166 | -Endif (159) no locks exists in CLL that overlap |
| 167 | -Else (177) the current request is an unlock |
| 168 | -If (171) unlock exactly matches a lock entry in CLL |
| 169 | -Delete the matching lock entry in CLL |
| 170 | -Set STATE to EXIT |
| 171 | -Else (176) no exact matching lock entry in CLL |
| 172 | -(e.g. unlock range is a subset of the lock) |
| 173 | - range) |
| 174 | -Create an entry for the new unlock in the CLL |
| 175 | -Set the STATE to M-CLM2 |
| 176 | -Endif (168) unlock exactly matches a lock entry in CLL |
| 177 | -Endif (158) the current request is a lock |
| 178 | -Endif (128) the current object has been migrated to C-LM2 |

Figure 9:
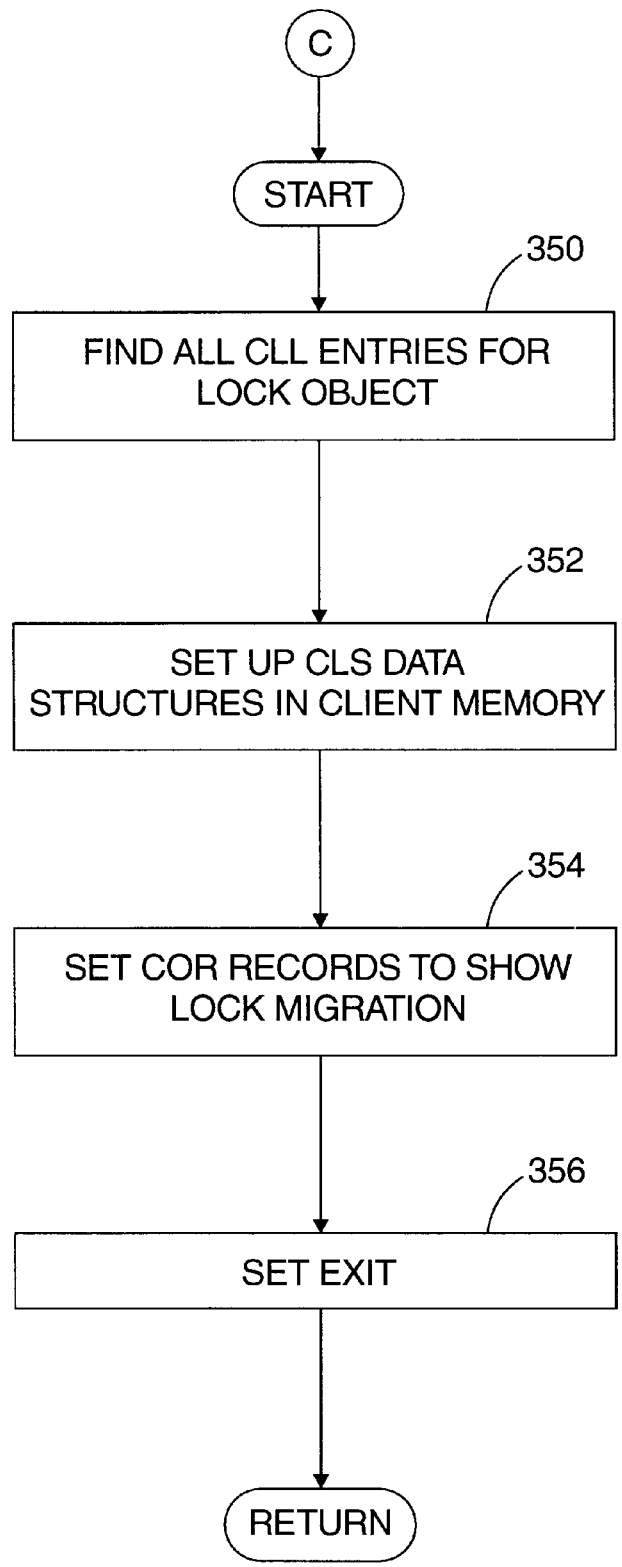
FIG. 9 is a flow diagram that represents second-stage client lock management operating steps performed by the remote clients illustrated in FIG. 2.

If the client state indicates that lock migration from C-LM1 to C-LM2 is to occur, then client operation follows the steps illustrated in FIG. 9 (corresponding to line 179 of the Table 4 pseudocode below). In the first step, C-LM2 finds all entries in the CLL for the current lock object, as represented by the flow diagram box numbered 350 in FIG. 9 (line 180 in Table 4). Next, the CLS data structures are entered as appropriate to execute the lock or unlock request, as the case may be, while retaining the entries in the CLL for possible future use. This processing is represented by the flow diagram box numbered 352 in FIG. 9 (lines 181–183 of Table 4). C-LM2 then sets the COR records necessary to indicate that locking for the data object has migrated to C-LM2 management. Such processing is indicated by the flow diagram box numbered 354 (lines 184–186 ). Finally, C-LM2 sets the client state to exit and returns to FIG. 6, as indicated by the flow diagram box numbered 356 (line 187 in Table 4).

TABLE 4

| | |
|---|---|
| 179 | -Case (204) - STATE is M-CLM2 |
| 180 | -Find all entries in CLL for the current lock object and |
| 181 | -Execute the corresponding locks or unlocks |
| 182 | -   chronologically in C-LM2 |
| 183 | -Retain the corresponding entries in CLL |
| 184 | -Record that the current object locking has been |
| 185 | -   migrated to C-LM2 by setting the indicator in |
| 186 | -   the COR for this object. |
| 187 | -Set STATE to EXIT |

Figure 10:
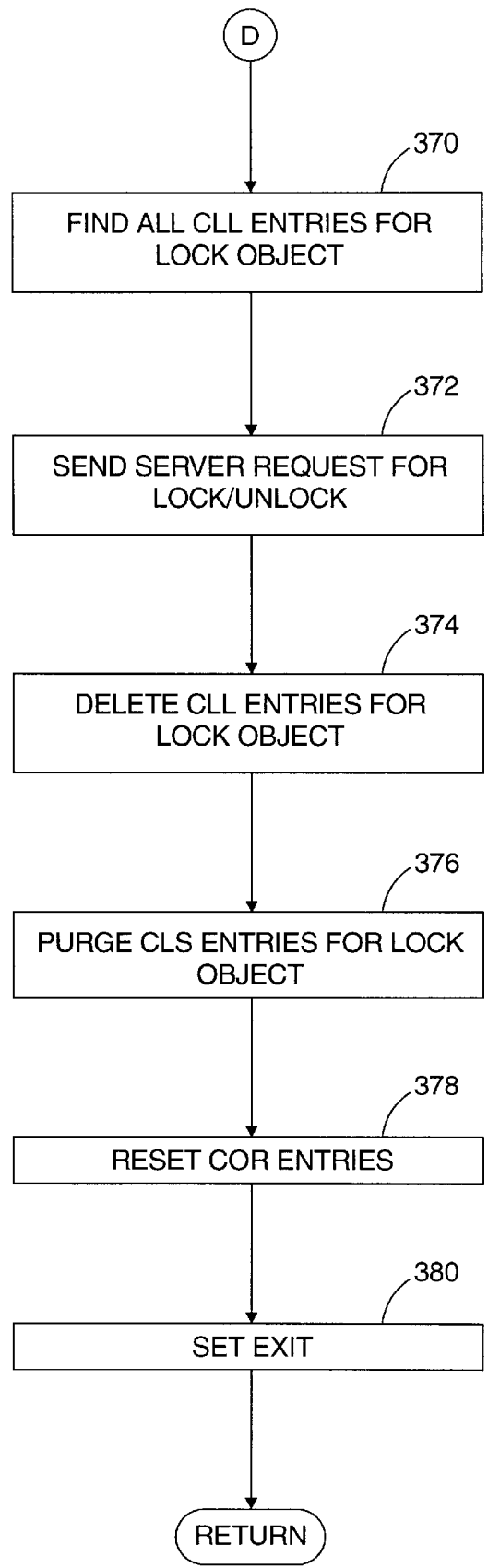
FIG. 10 is a flow diagram that represents lock migration operating steps performed by the remote clients illustrated in FIG. 2.

If the client state indicates that lock migration to the server is to occur, then client operation follows the steps illustrated in FIG. 10 (corresponding to line 188 in Table 5). First, the client finds all entries in the CLL for the current lock object, as indicated by the flow diagram box numbered 370 in FIG. 10 (line 189 in Table 5). Then, for each CLL entry, the client sends a corresponding lock or unlock request, as appropriate, to the server lock manager S-LM with an indication that the entry is a lock migration response. Such responses also will include information necessary for responding to queued lock responses by the server, such as the client identification and lock identification. This processing is represented by the flow diagram box numbered 372 (lines 190–194 in Table 5). After sending the migration responses, the client deletes the corresponding entries in the CLL, as represented by the flow diagram box numbered 374 (line 195 of Table 5).

Next, the client purges all lock and unlock entries for the lock object in the CLS if the lock object that is the subject of the request being processed was migrated to C-LM2. To determine if such migration occurred, the client checks the entry in the COR for the lock object, as indicated by the flow diagram box numbered 376 (lines 196–199 of Table 5). The client then resets the COR entries for the lock object to indicate that locking for the lock object has been migrated to the server. This processing is represented by the flow diagram box numbered 378 (lines 200–202 of Table 5). Finally, the client sets the client state to exit and returns to FIG. 6, as represented by the flow diagram box numbered 380 and lines 203–206 of Table 5.

TABLE 5

| | |
|---|---|
| 188 | -Case (204) - STATE is M-SLM |
| 189 | -Find all entries in CLL for the current lock object and |
| 190 | -Send corresponding lock or unlock to S-LM with |
| 191 | -   indicator in each request that it is lock migration. |
| 192 | -   Include information in the migrated lock/unlock |
| 193 | -   requests that is needed for responding to queued |
| 194 | -   lock responses by S-LM. |
| 195 | -Delete the corresponding entries in CLL. |
| 196 | -If (199) the current object has been migrated to C-LM2 |
| 197 | -as determined from the indicator in the COR |
| 198 | -Purge all locks/unlocks for the object in C-LM2 |
| 199 | -Endif (196) the current object has been migrated to C-LM2 |
| 200 | -Record that the current object locking is migrated to |
| 201 | -   the server by resetting both indicators in the COR |
| 202 | -   for the object. |
| 203 | -Set STATE to EXIT |
| 204 | -Endcase (104) |
| 205 | -Enddo (103) until STATE = EXIT |
| 206 | -End (180) |

Figure 11:
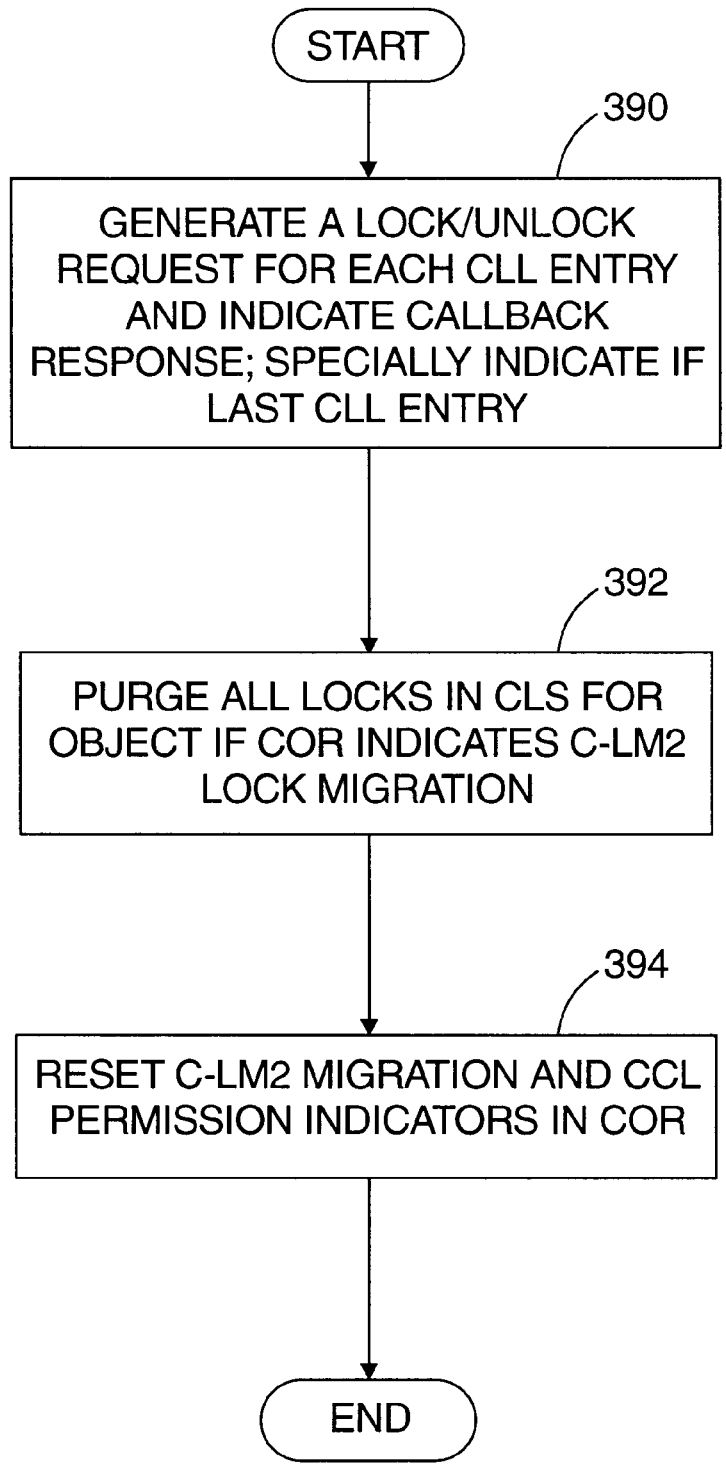
FIG. 11 is a flow diagram that represents callback processor operating steps performed by the remote clients illustrated in FIG. 2.
Figure 12:
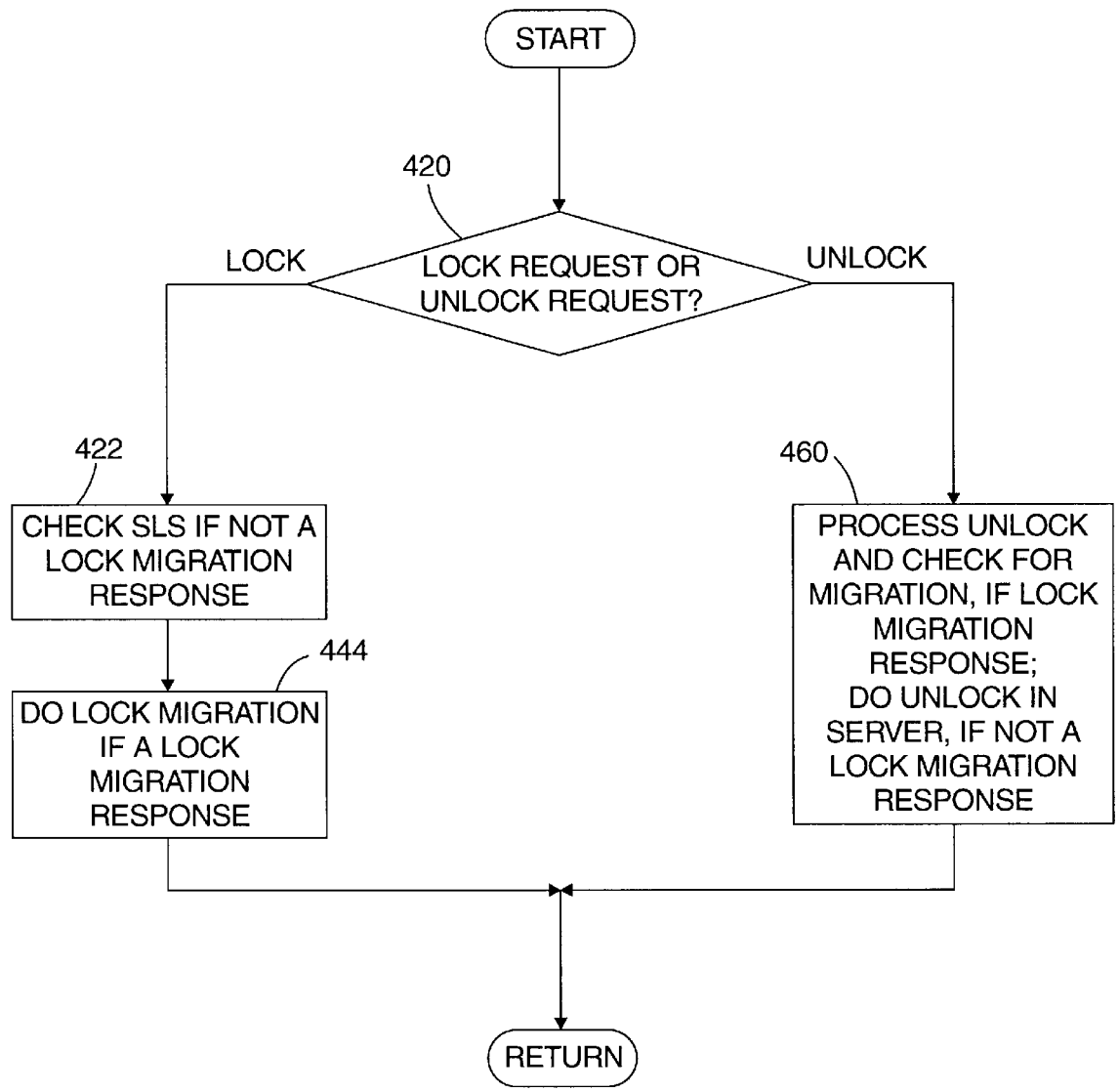
FIG. 12, FIG. 13, FIG. 14, and FIG. 15 are flow diagrams that represent operating steps performed by the server illustrated in FIG. 2.

On occasion, granted locks will be recalled by the server. As noted above, each client includes a callback processor to handle callback commands from the server. The processing steps performed by a client callback processor are represented in the flow diagram of FIG. 11 and the pseudocode of Table 6 below. As with the client lock manager processing described above, those skilled in the art will appreciate that the FIG. 11 flow diagram represents processing steps carried out by appropriate programming instructions, which are stored in the client RAM and executed by the client CPU, and which can be created in view of the operating description and drawings herein. Such operating steps thereby comprise the callback processor of the client.

Callback processor operation begins when the client receives a callback command from the server that revokes the CCL privilege for a particular data file. Such operation follows the steps illustrated in FIG. 11 (corresponding to lines 100–102 in Table 6). In response to the callback command, the callback processor generates a lock or unlock request, as the case may be, for each CLL entry and indicates that the request is a callback response. The request for the last CLL entry is specially indicated as being the last request. Such operation is represented by the flow diagram box numbered 390 in FIG. 11 (lines 103–109 in Table 6). Next, the callback processor purges all locks in the CLS for the lock object if the COR entry for the lock object indicates C-LM2 migration, as represented by the flow diagram box numbered 392 (lines 110–112 in Table 6). Finally, the callback processor resets the COR indicators for C-LM2 migration and CCL permission, as represented by the flow diagram box numbered 394 (lines 113–115 in Table 6). Thus ends callback operation.

TABLE 6

| | |
|---|---|
| 100 | -Begin (115) Client Callback Processor |
| 101 | -(Invoked when a receiving a callback of CCL privilege |
| 102 | -   from the server for a particular object) |
| 103 | -For each entry in CLL for the called back object. |
| 104 | -Do (109) |
| 105 | -Generate a Request (lock or unlock) to the server and |
| 106 | -   mark the request as a migrated request. |
| 107 | -For the last such request, indicate in the request that |
| 108 | -   it is the final migration request of a callback response. |
| 109 | -Enddo (104) |
| 110 | -If (112) the COR indicator for C-LM2 migration is set |
| 111 | -Purge all locks in CLS for the object |
| 112 | -Endif (110) the COR indicator for C-LM2 migration is set |
| 113 | -Reset C-LM2 migration and CCL permission indicators |
| 114 | -   in the COR. |
| 115 | -End (100) |

The operation of the server 106 will be better understood with reference to the flow diagrams of FIGS. 12–17 and the pseudocode listings of Tables 7–11 below. Those skilled in the art will appreciate that the pseudocode represents a high-level description of the programming instructions executed by the server CPU and can be depicted by the corresponding flow diagrams. In the pseudocode, line numbers are included along the left edge of each table for ease of reference. Parenthetical numerical references in the pseudocode are to blocks of related code and generally define beginning and ending lines of loops, such as Begin . . . End loops, If-Else-Endif loops, Do-Enddo loops, and the like. Those skilled in the art also will appreciate that the flow diagrams represent operating steps specified by appropriate programming instructions, which are stored in the server RAM and can be executed by the server CPU, and which can be created in view of the operating description and drawings herein.

Figure 13:
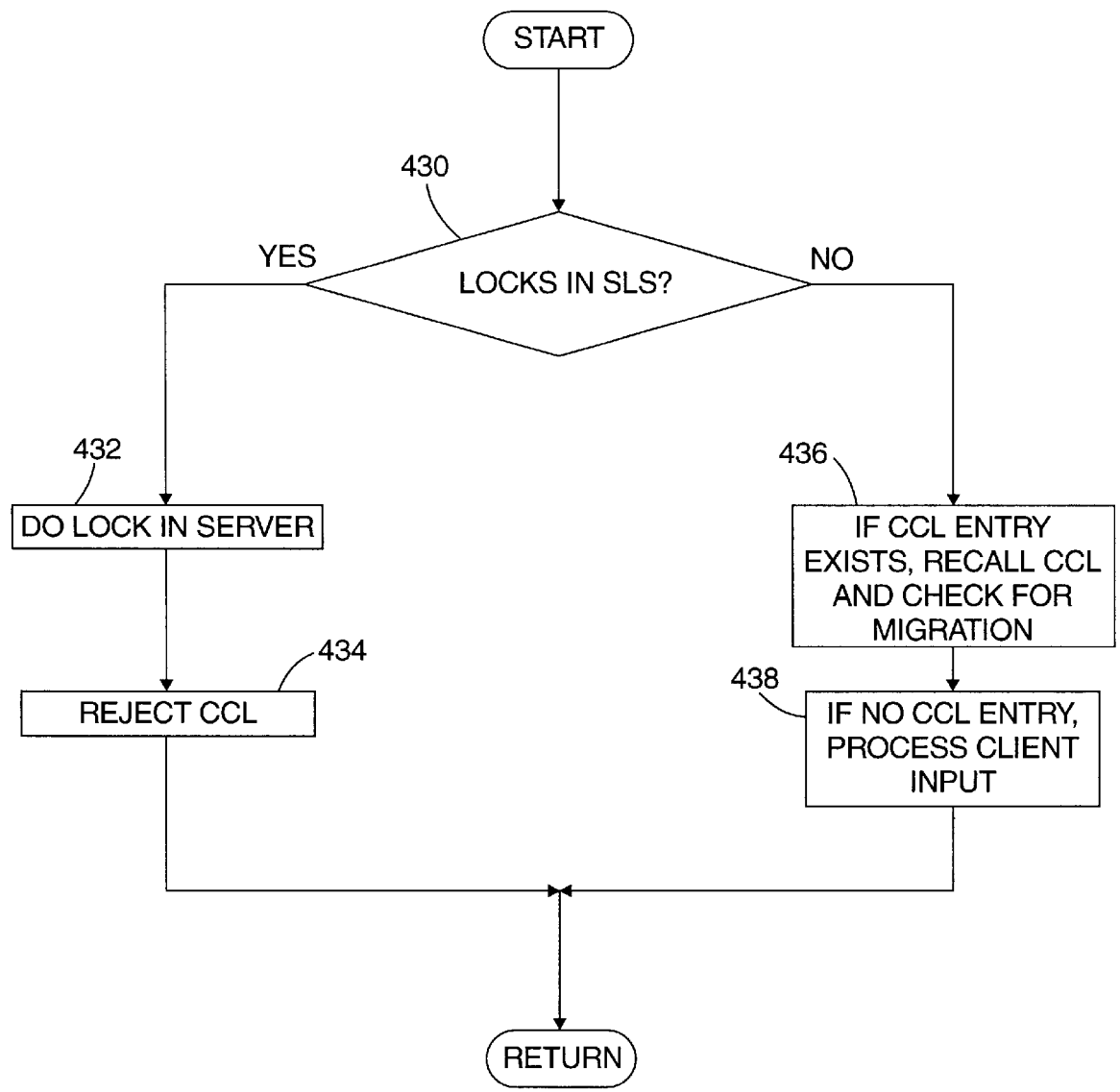
Figure 14:
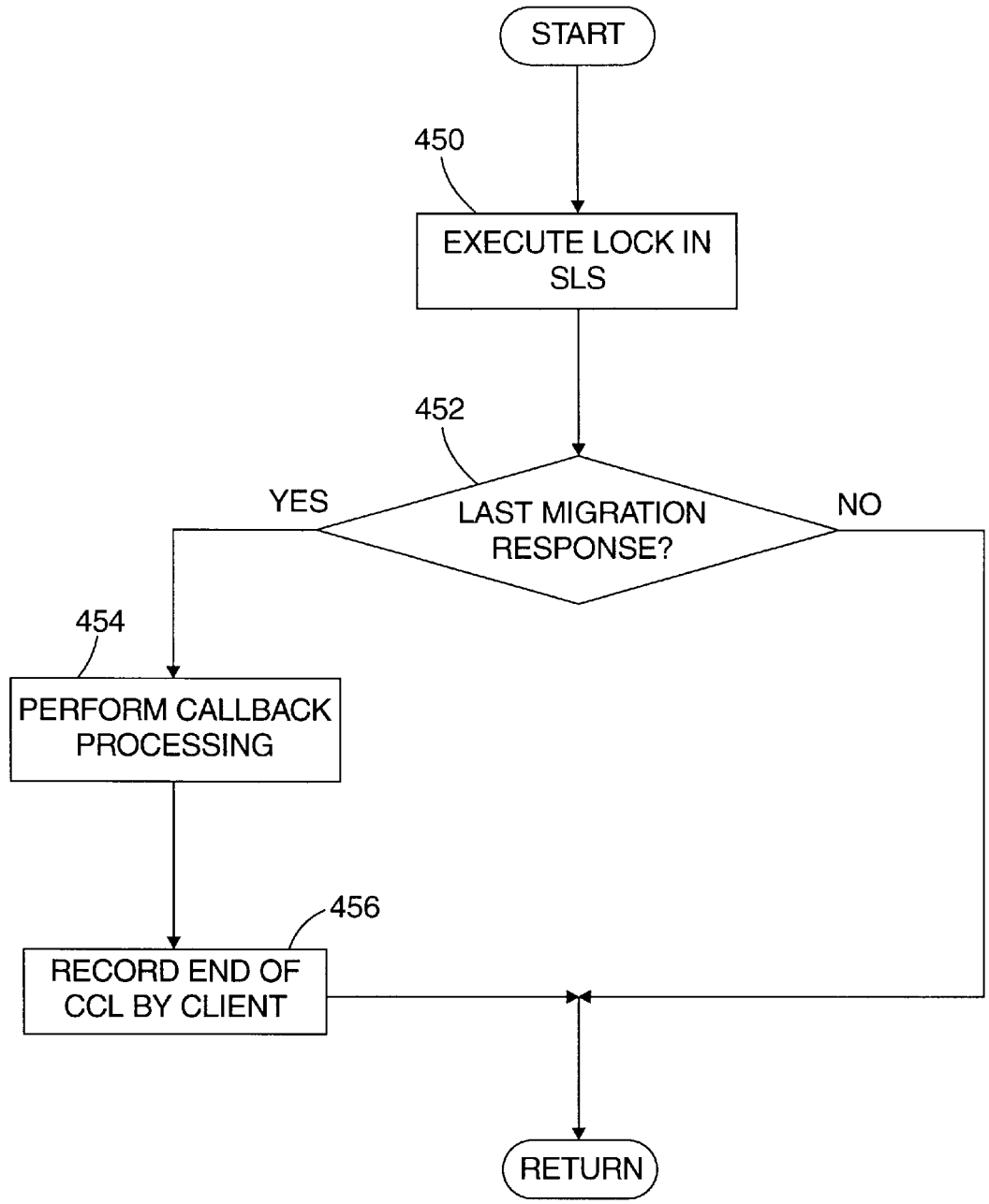

The operating steps performed by the server 106 are represented in the flow diagrams of FIGS. 12 through 17. Server processing begins with receipt of a client request, which can be either a lock request or an unlock request, as indicated by the decision box numbered 420 in FIG. 12 and lines 100 and 101 of Table 7. If the client request was for a lock, an affirmative outcome at the decision box 420, then the server determines its response by first checking to see if the request was a lock migration response. If it was not a migration response, then the client must be requesting client cached locking and the server must determine whether CCL locking is appropriate. The server makes this determination by first checking the SLS for existing locks. This processing is represented by the FIG. 12 flow diagram box numbered 422. Details of the server processing relating to SLS locks are illustrated in FIG. 13.

In the preferred embodiment, locking in the server is carried out if there is contention for a data file. That is, if there are existing locks in the SLS for the data file within which the requested lock is contained, then locking will be managed in the server for this request. This is represented by the positive outcome at the FIG. 13 decision box numbered 430. For server-managed locking, the server executes the lock in the SLS through creation of the appropriate server data lock structures and storage of them in the SLS. The server can queue lock requests, if the request are too numerous to handle immediately. These server operations are represented by the flow diagram box numbered 432 and lines 102–108 of Table 7. As part of the server managed locking response, the server sets up a response to the client request indicating that CCL permission was not granted. This operation step is represented by the flow diagram box numbered 434 and line 109 of Table 7. The manner of formulating the server response and sending it to the requesting client will depend on the network protocol being used and the particular implementation of the system. Such concerns do not form a part of the invention described herein and are a matter of design choice.

TABLE 7

| | |
|---|---|
| 100 | -Begin (197) Server Logic for lock and unlock requests |
| 101 | -If (196) a Lock request or Unlock Request |
| 102 | -If (174) Lock request |
| 103 | -If (154) Not a lock migration response |
| 104 | -If (110) there are existing locks in SLS |
| 105 | -S-LM execute the current lock in SLS |
| 106 | -(NOTE - S-LM handles queuing for locks |
| 107 | -    when necessary. When there is |
| 108 | -    queuing, there is a task wait here). |
| 109 | -Set up response - CCL rejected |
| 110 | -Else (153) there are no existing locks in SLS |

Continuing the server response processing for a lock request that was not a lock migration response, if the server determined there were no existing locks in the SLS (see line 110 of Table 7), a negative outcome at the decision box 430, then the server still might manage locking if there is no lock contention among the clients or if the current client has not requested CCL. Therefore, the server next checks to see if there is a CCL entry for the data file containing the current lock object. If there is a CCL entry, it can correspond to either the current client's entry in its own CCL, or it can correspond to a lock already held by another client. To find which is the case, the server recalls all CCL entries for the data file throughout the distributed system. The server does this by issuing a callback command for the data file. This step is represented by the FIG. 13 flow diagram box numbered 436.

It is possible that a client has a lock entry in a CCL but has completed its processing relative to the lock object. That is, a client might have a lock but is not actively using it. In that case, the client will complete its processing by deleting its CCL entry and will not return a lock migration response. Therefore, the server can permit CCL locking for the current request being processed if no lock migration occurs in response to the lock recall. Thus, if the requesting client asked for CCL locking, as indicated by the lock request field in the client's CCL entry, then the server sets up a response that indicates CCL locking is allowed. These operating steps are represented by lines 111–119 of Table 8.

If the requesting client did not ask for CCL locking, then the server performs lock management by setting up the appropriate server data lock structures in the SLS. The server also sets up a response to the requesting client indicating that CCL locking is rejected and server managed locking will be performed. That is, the server will manage the locking, but the client will have access to the lock object. This step is represented by lines 120–128 of Table 8. The server processing of the current request ends and control returns to the server CPU for the next system task. If lock migration did occur in response to the lock recall and CCL locking was requested, then the server must execute the locking for the data file containing the lock object. Therefore, the server sets up a lock request response to indicate that CCL was rejected and that locking will be completed by the server. The CCL rejection is represented by lines 129–136 of Table 8. The server processing where there was no lock migration response to the lock recall is included in the FIG. 13 flow diagram box numbered 436.

TABLE 8

| | |
|---|---|
| 111 | -If (137) CCL exists somewhere |
| 112 | -Callback CCL |
| 113 | -Wait for response and possible lock migration |
| 114 | -If (120) no lock migration occurred |
| 115 | -If (120) CCL requested |
| 116 | -Award CCL to current requestor |
| 117 | -    and record this current holder of that |
| 118 | -    capability for the applicable file object |
| 119 | -Set response - CCL allowed |
| 120 | -Else (127) CCL not requested |
| 121 | -S-LM execute the current lock in SLS |
| 122 | -(NOTE - S-LM handles queuing for locks |
| 123 | -    when necessary. When there is |
| 124 | -    queuing, there is a task wait here). |
| 125 | -Set up response - CCL rejected but locking |
| 126 | -    if completed by the S-LM. |
| 127 | -Endif (115) CCL requested |
| 128 | -Exit return with CCL response |
| 129 | -Else (136) lock migration occurred |
| 130 | -S-LM execute the current lock in SLS |
| 131 | -(NOTE - S-LM handles queuing for locks |
| 132 | -    when necessary. When there is |
| 133 | -    queuing, there is a task wait here). |
| 134 | -Set up response - CCL rejected, but locking |
| 135 | -    is completed by the S-LM. |
| 136 | -Endif (114) no lock migration occured |

If there were no existing locks in the SLS and if the server found no CCL entries for the data file containing the lock object (see lines 104 and 110 of Table 7 and line 111 of Table 8), then the requesting client is free to have the requested lock. This is indicated by line 137 of Table 9. The server processes the client request by next determining if the client asked for CCL locking. If so, the server grants CCL locking, records the client as having the lock for the data object, and sets up the CCL granted response back to the requesting client. If the client did not ask for CCL locking, then the server executes the lock in the SLS and sets up the appropriate response to the requesting client. These operating steps are represented by the FIG. 13 flow diagram box numbered 438 and lines 138–153 of Table 9. This ends server lock request processing where no locks were found in the SLS.

TABLE 9

| | |
|---|---|
| 137 | -Else (152) no CCL exists |
| 138 | -If (143) CCL requested |
| 139 | -Award CCL to current requestor |
| 140 | - and record this current holder of that |
| 141 | - capability for the applicable file object |
| 142 | -Set response - CCL allowed |
| 143 | -Else (150) CCL not requested |
| 144 | -S-LM execute the current lock in SLS |
| 145 | -(NOTE - S-LM handles queuing for locks |
| 146 | - when necessary. When there is |
| 147 | - queuing, there is a task wait here). |
| 148 | -Set up response - CCL rejected but locking |
| 149 | - is completed by the S-LM |
| 150 | -Endif (138) CCL requested |
| 151 | -Exit return with CCL response |
| 152 | -Endif (111) CCL exists somewhere |
| 153 | -Endif (104) there are existing locks in SLS |

If the client request was for a lock (an affirmative outcome at the FIG. 12 decision box numbered 420) and there was lock migration in response to the lock recall, then the server must carry out lock migration. This is indicated by the flow diagram box numbered 444 in FIG. 12 and line 154 of Table 10 below. Details of the lock migration processing are illustrated in the flow diagram of FIG. 14.

The server processes a lock migration response from a client by executing a lock in the SLS. As noted above, the server executes a lock in the SLS through creation of the appropriate server data lock structures and storage of them in the SLS. A lock migration response can be a waiting lock; that is, an indication that the client returning the lock is due to receive the lock when another client is completed. In that case, the server will accommodate such queuing by recording the original client waiting process using information in the migrated lock request. Such processing is represented by the FIG. 14 flow diagram box numbered 450 and lines 155–163 of Table 10.

The server detects if a migration response is the last migration response to come from a client. This is indicated by the decision box numbered 452. If the last migration response has been encountered, an affirmative outcome, then the server checks for callback processing. That is, if the migration response was the result of a lock recall, then the client returning the lock must still want to have access to the lock object. Therefore, the server will post the client as one who is waiting for a lock. This avoids losing the client process as one whose lock request still must be satisfied. The details of client posting and queuing of lock requests can be carried out according to the protocols of the distributed system and in any of different conventional schemes, and therefore such details are not described herein. If the migration response was not the result of a lock recall, then the client does not need to be posted and no additional action is necessary. The callback processing operation steps are represented by the block diagram numbered 454 and by lines 164–170. Finally, if the migration response was the last migration response from the client, then the server records in its SLS information indicating that the client no longer is performing CCL locking for the data file in question. This is represented by the flow diagram box numbered 456 and by line 171 in Table 10. Thus concludes the server processing for a lock migration response, as indicated by the RETURN box in FIG. 14 and lines 172–173 of Table 10, which indicates that server processing returns to FIG. 12 and Table 11, respectively. Server processing also concludes if the migration response was not the last migration response, a negative outcome at the FIG. 14 decision box numbered 452.

TABLE 10

| | |
|---|---|
| 154 | -Else (173) Is a lock migration response |
| 155 | -S-LM execute the current lock in SLS |
| 156 | -(NOTE - S-LM handles queuing for locks |
| 157 | - when necessary. When there is |
| 158 | - queuing for a migrated lock, there is |
| 159 | - no wait here because the client process |
| 160 | - that is currently migrating the lock is |
| 161 | - not the one that initiated the lock. |
| 162 | - Record the original client waiting process |
| 163 | - using information in the migrated lock request). |
| 164 | -If (172) the current request is last migration response |
| 165 | -If (168) migration is from a callback |
| 166 | -Post the waiting lock requestor (server task that |
| 167 | - initiated the callback of CCL) |
| 168 | -Else (170) |
| 169 | -No action |
| 170 | -Endif (165) migration is from a callback |
| 171 | -Record that migrator is no longer doing CCL |
| 172 | -Endif (164) the current request is the last migration |
| 173 | -Endif (103) Not a lock migration response |

If the client request was not for a lock (a negative outcome at the FIG. 12 decision box numbered 420), then the server will carry out unlock request processing. These operation steps are represented by the FIG. 12 flow diagram box numbered 460. Details of the unlock processing are illustrated in the FIG. 15 flow diagram and the pseudocode listed in Table 11 below.

Figure 15:
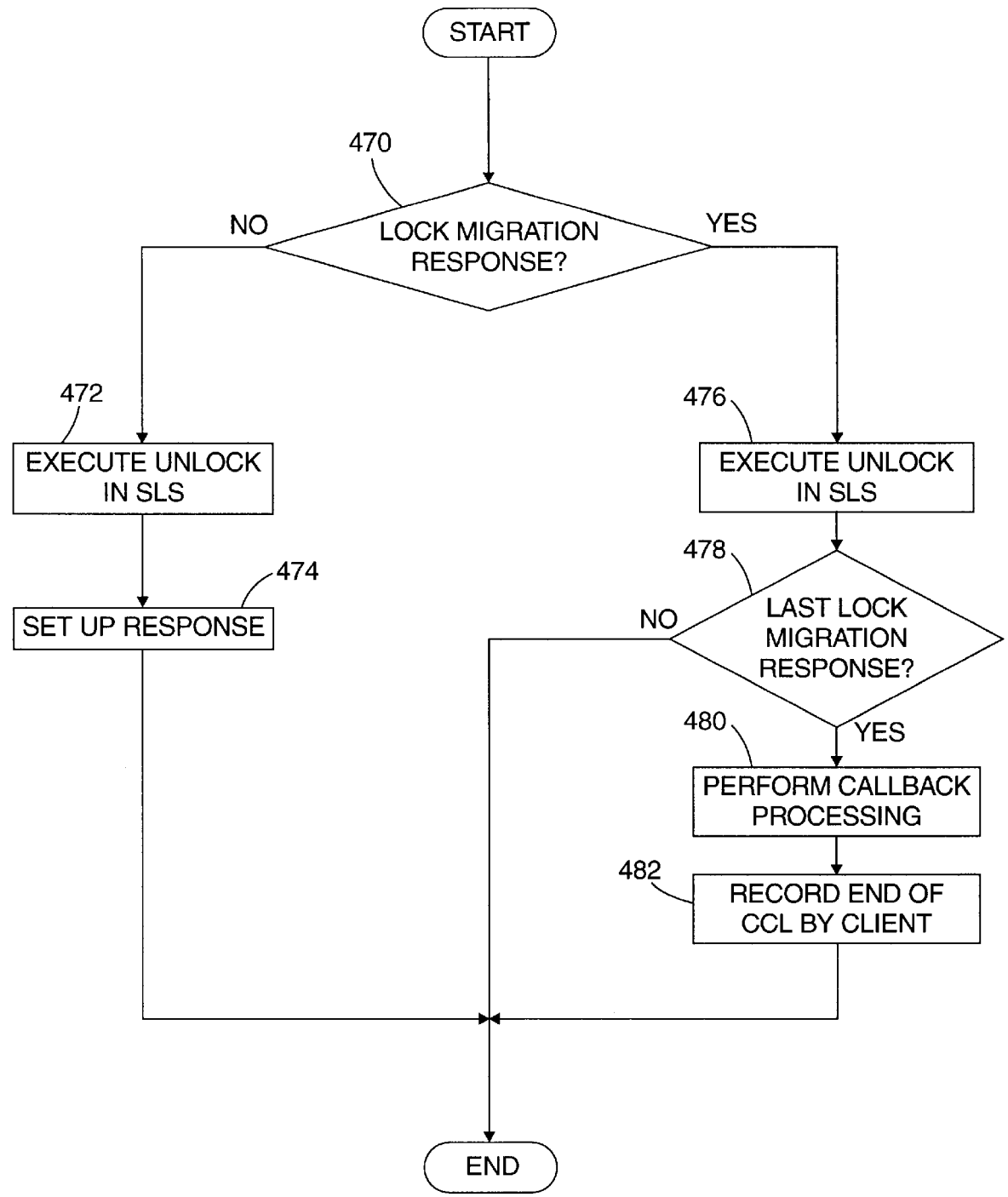

In processing an unlock request, the server first determines if the request from the client was a lock migration response, as indicated by the FIG. 15 decision box numbered 470. If the client did not issue a lock migration response, then the server executes an unlock operation in the SLS, which is executed by deleting the data lock structures for the lock from the SLS. The server can accommodate any posting of server tasks that might be necessary, as the SLS data lock structures are quite complex and might require the server's uninterrupted attention. These operations are represented by the flow diagram box numbered 472 and lines 175–178 of Table 11. A response to the client is then set and lock migration response processing ends, as represented by the flow diagram box numbered 474 and line 179 of Table 11.

If the client issued a lock migration response, an affirmative outcome at the decision box numbered 470, then again the server executes an unlock operation in the SLS. Unlike before, however, there should be no waiting because any client who issued a lock migration response should have already posted any waiting client processes before such migration. The unlocking operation is represented by the FIG. 15 flow diagram box numbered 476 and lines 180–186 of Table 11.

The server next checks for the last migration response indicator, as represented by the decision box numbered 478 and line 187 of Table 11. If it is the last migration response, an affirmative outcome at the decision box, then the server performs callback processing if the migration response was from a lock recall. The callback processing involves posting the waiting lock requester, which actually is the server task that initiated the recall of the CCL locking. This processing is represented by the flow diagram box numbered 480 and lines 188–191 of Table 11. Even if the last migration response was not from a callback, the server next records that the client no longer is performing CCL locking by changing the client's CCL entry. This operation is represented by the flow diagram box numbered 482 and line 192 of Table 11.

After the recording step following a last migration response, or immediately after unlock processing in the absence of a last migration response, the server processing for a client request ends and control returns to the server CPU for performing the next server task. This is indicated by the RETURN box of FIG. 15 and lines 193–197 of Table 11.

TABLE 11

```
174   -Else (195) Unlock request
175       -If (180) Not a lock migration response
176           -S-LM execute the current unlock in SLS
177           -(NOTE - S-LM handles posting of server tasks that
178           -     are waiting for the this lock).
179           -Set up response
180       -Else (194) Is a lock migration response
181           -S-LM execute the current unlock in SLS
182           -(Note - there should be no posting of waiting
183           -     lockers here because a migrated waiter
184           -     should still be waiting. This is true
185           -     because the client has already posted
186           -     any satisfied waiters before migration).
187           -If (193) the last migration response
188               -If (191) migration is from a callback
189                   -Post the waiting lock requestor (server task that
190                   -    initiated the callback of CCL)
191               -Endif (188) migration is from a callback
192               -Record that migrator no longer doing CCL
193           -Endif (187) the last migration response
194       -Endif (175) Not a lock migration response
195   -Endif (102) Lock request
196  -Endif (101) a Lock request or Unlock Request
197  -End
```

The distributed processing system described above provides dynamic selection of byte range locking between client-based lock management and server based management. Client lock managers and server lock managers are separately optimized such that three-stage locking is implemented between two client lock managers the handle the case where there is no lock contention and a server lock manager that handles contention and overlapping byte ranges.

The present invention has been described above in terms of a presently preferred embodiment so that an understanding of the present invention can be conveyed. There are, however, many configurations for lock managers not specifically described herein but with which the present invention is applicable. The present invention should therefore not be seen as limited to the particular embodiment described herein, but rather, it should be understood that the present invention has wide applicability with respect to lock managers generally. All modifications, variations, or equivalent arrangements that are within the scope of the attached claims should therefore be considered to be within the scope of the invention.

We claim:

1. A method of providing staged object locks in response to the level of lock complexity and system resource limitation in a distributed computer processing system in which a server that operates in accordance with a server environment is connected to a direct access storage device containing data objects, and a plurality of client processes that operate in accordance with respective client environments, at least one of which has access to the data objects, and that generate requests to the server for locks that cover data object portions comprising respective data objects in their entirety or portions of the data objects, the method comprising the steps of:

receiving a lock request at the server from a first client process for an object lock in one of the data objects;

determining if any other client process has requested an object lock in the same data object;

responding to the lock request of the first client process if it is determined that no other client process has requested a lock for the same data object by granting the requested lock to the first client process and recording the lock locally in the client environment of the first client process;

responding to the lock request of the first client process, if it is determined that at least a second client process has locally recorded in its environment a lock for the same data object, by migrating any locks recorded in the respective client environments for an object portion within the same data object to the server environment, wherein the migrating locks for either the respective data objects in their entirety or portions of the data objects is effectuated even when client and server lock managers are different, placing all lock requests for portions of the same data object in contention in the server, and determining a queue order in which the requested locks will be granted to the requesting client processes.

2. A method as defined in claim 1, wherein the step of recording the lock locally in the client environment of the first client process includes adding an entry to a client lock log in the client environment containing row entries that contain sufficient information to reconstruct the lock request of the first client process.

3. A method as defined in claim 2, wherein the lock request of the first client process includes data that specifies whether the client process desires recording of locks in the requesting client environment, and the step of recording the lock in the client environment of the first client process is executed only if the received lock request specifies that the first client process desires recording of locks locally in the client environment.

4. A method as defined in claim 1, further including the steps of:

determining if any other client process in the client environment of the first client process has requested an object lock for an overlapping portion of a data object for which a lock is already maintained in the client environment;

responding to the lock request by placing all lock requests and locally maintained locks in the client environment for the same data object in contention in the client environment and determining a queue order in which the locks will be granted to the requesting client processes.

5. A method as defined in claim 4, wherein the step of recording the lock locally in the client environment of the first client process includes the steps of:

adding an entry to a client lock log in the client environment that contains row entries having sufficient information to reconstruct the lock request; and storing a client lock structure in the client environment such that the client lock structure identifies the first client process as holding the granted lock, the data object for which the lock has been granted, and the object portion covered by the corresponding lock.

6. A method as defined in claim 5, wherein the step of migrating all locks for the same data object recorded in the respective client environments to the server environment includes the steps of:

determining sufficient information to reconstruct the original lock request from the client lock log;

generating the original lock request in accordance with the reconstruction information from the client lock log and sending it to the server; and storing a server lock structure in the server environment such that the server lock structure identifies the client process holding the granted object lock, the data object for which the lock has been granted, and the object portion covered by the corresponding lock.

7. A method as defined in claim 5, wherein the step of storing a client lock structure includes the step of storing sufficient client process and data object information to support splitting the object portion covered by locks recorded in the client environment to reflect the determined queue order for the requested locks.

8. A method as defined in claim 1, wherein the step of migrating all locks for the same data object recorded in the respective client environments to the server environment includes the steps of:

determining sufficient information to reconstruct the original lock request from a client lock log;

generating the original lock request in accordance with the reconstruction information and sending it to the server; and storing a server lock structure in the server environment such that the server lock structure identifies the client process holding the granted lock, the data object for which the lock has been granted, and the object portion covered by the corresponding lock.

9. A method as defined in claim 8, further including the step of deleting the client lock log entry and the client lock structure for the migrated lock.

10. A method as defined in claim 1, further including the steps of:

determining if a predetermined client resource limit has been reached that prevents the local recording of a lock in the client environment;

responding to the lock request of the first client process, if it is determined that the predetermined client resource limit has been reached, by migrating all object locks recorded in the client environment to the server environment.

11. A method as defined in claim 10, wherein the step of migrating all locks in the client environment to the server environment includes the steps of:

determining sufficient information to reconstruct the original lock request from a client lock data structure;

generating the original lock request in accordance with the reconstruction information and sending it to the server; and storing a server lock structure in the server environment such that the server lock structure identifies the client process holding the granted lock, the data object for which the lock has been granted, and the object portion covered by the corresponding lock.

12. A method as defined in claim 1, wherein the first received client process lock request includes data that specifies whether the client process desires to wait for a requested lock if it cannot be granted immediately, and the step of determining if the object portion covered by the requested lock overlaps the object portion covered by another lock and placing all lock requests for the same data object in contention for the lock request is executed only if the received request specifies that the client desires to wait for a requested lock.

13. A computer processing system comprising:

a server that operates in accordance with a server environment;

a direct access storage device containing data objects;

a plurality of client processes, at least one of which has access to the data objects, that operate according to respective client environments;

receiving means for receiving client process requests at the server from the client processes for locks that cover data object portions comprising respective data objects in their entirety or portions of the data objects;

cache means for determining if an object lock in a data object requested by a first client process also has been requested by another client process and, if no other client process has requested a lock in the same data object, responding to the lock request of the first client process by granting an object lock to the first client process and recording the lock locally in the client environment of the first client process; and contention means for determining if the object portion covered by the first client process lock request overlaps the object portion covered by at least a second client process request and, if there is overlap, responding to the lock request by migrating any locks recorded in the client environments for the same data object to the server environment, wherein the migrating locks for the respective data objects in their entirety or portions of the data objects is effectuated even when client and server lock managers are different, placing all lock requests for the same data object in contention, and determining a queue order in which the requested locks will be granted to the requesting client processes, whereby staged locking occurs in the system in response to lock complexity level and the system resource limitations.

14. A computer processing system as defined in claim 13, wherein the cache means adds an entry to a client lock log in the client environment that contains row entries with sufficient information to reconstruct the original lock request.

15. A computer processing system as defined in claim 14, wherein the first received lock request includes data that specifies whether the first client process desires recording of locks locally in the client environment, and the cache means executes its process operations only if the received request specifies that the first client process desires recording of locks locally in the client environment.

16. A computer processing system as defined in claim 13, wherein the cache means determines if any other client process in the client environment of the first client process has requested an object lock for an overlapping portion of a data object for which a lock is already maintained in the client environment and responds to the lock request by placing all lock requests and locally maintained locks in the client environment for the same data object in contention and determining a queue order in which the locks will be granted to the requesting client processes.

17. A computer processing system as defined in claim 13, wherein the client environment includes a client cache log and a client lock structure and the cache means adds an entry to a client lock log containing row entries that contain sufficient information to reconstruct the original lock request and stores a client lock structure in the client environment such that the client lock structure identifies the client process holding the granted lock, the data object for which the lock has been granted, and the object portion covered by the corresponding lock.

18. A computer processing system as defined in claim 17, wherein the contention means determines sufficient information to reconstruct the original lock request from the client lock log, generates the original lock request in accordance with the reconstruction information from the client lock log and sends it to the server, and stores a server lock structure in the server environment such that the server lock structure identifies the client process holding the granted lock, the data object for which the lock has been granted, and the object portion covered by the corresponding lock.

19. A computer processing system as defined in claim 17, wherein the cache means stores sufficient client process and data object information in the client environment to support splitting the object portion covered by locks recorded in the client environment.

20. A computer processing system as defined in claim 13, wherein the contention means determines sufficient information from a client lock data structure to reconstruct the original lock request, generates the original lock request in accordance with the reconstruction information and sends it to the server, and stores a server lock structure in the server environment such that the server lock structure identifies the client process holding the granted lock, the data object for which the lock has been granted, and the object portion covered by the corresponding lock.

21. A computer processing system as defined in claim 20, wherein the contention means further deletes the client lock log entry and the client lock structure for the migrated lock.

22. A computer processing system as defined in claim 13, wherein the cache means determines if a predetermined client resource limit has been reached that prevents the local recording of a lock in the client environment and responds to the lock request of the first client process, if the cache means determined that the predetermined client resource limit has been reached, by migrating all locks recorded in the client environment to the server environment.

23. A computer processing system as defined in claim 22, wherein:
 the client environment includes a client lock data structure, wherein the cache means determines sufficient information to reconstruct the original lock request from the client lock data structure and generates the original lock request in accordance with the reconstruction information in response to a callback command from the server and sends the generated lock request to the server; and
 the server environment includes a server lock structure, wherein the server records locks in the server lock structure with sufficient information to identify the client process holding the granted lock, the data object for which the lock has been granted, and the object portion covered by the corresponding lock.

24. A computer processing system as defined in claim 13, wherein the first received client process lock request includes data that specifies whether the client process desires to wait for a requested lock if it cannot be granted immediately, and the contention means for determining if the object portion covered by the requested lock overlaps the object portion covered by another lock and placing all lock requests for the same data object in contention for the lock request performs its process operations only if the received request specifies that the client desires to wait for a requested lock.

25. A program storage device readable by a server processor machine that includes a direct access storage device containing data files and communicates with a plurality of clients, the program storage device tangibly embodying a program of instructions executable by the processor machine to perform method steps for granting locks that cover data object portions comprising respective data objects in their entirety or portions of the data objects, such that the method steps performed by the server processor machine comprise the steps of:
 receiving a lock request at the server from a first client process for an object lock in one of the data objects;
 determining if any other client process has requested an object lock in the same data object;
 responding to the lock request of the first client process if it is determined that no other client process has requested a lock for the same data object by granting the requested lock to the first client process and recording the lock locally in the client environment of the first client process;
 responding to the lock request of the first client process, if it is determined that at least a second client process has locally recorded in its environment a lock for the same data object, by migrating any locks recorded in the respective client environments for an object portion within the same data object to the server environment, wherein migrating any locks of either the respective data objects in their entirety or portions of data objects occurs even when client and server lock managers are different, placing all lock requests for the same data object in contention in the server, and determining a queue order in which the requested locks will be granted to the requesting client processes, whereby staged locking occurs in response to lock complexity level and the machine resource limitation.

26. A program storage device as defined in claim 25, wherein the performed method steps cause the local recording of the lock in the client environment of the first client process to include adding an entry to a client lock log in the client environment containing row entries that contain sufficient information to reconstruct the lock request of the first client process.

27. A program storage device as defined in claim 26, wherein the lock request of the first client process includes data that specifies whether the client process desires recording of locks in the requesting client environment, and the step of recording the lock in the client environment of the first client process is executed only if the received lock request specifies that the first client process desires recording of locks locally in the client environment.

28. A program storage device as defined in claim 25, wherein the performed method steps include the steps of:
 determining if any other client process in the client environment of the first client process has requested a lock for an overlapping portion of a data object for which a lock is already maintained in the client environment;
 responding to the lock request by placing all lock requests and locally maintained locks in the client environment for the same data object in contention in the client environment and determining a queue order in which the locks will be granted to the requesting client processes.

29. A program storage device as defined in claim 28, wherein the performed method step of recording the lock locally in the client environment of the first client process includes the steps of:
 adding an entry to a client lock log in the client environment that contains row entries having sufficient information to reconstruct the lock request; and
 storing a client lock structure in the client environment such that the client lock structure identifies the first client process as holding the granted object lock, the data object for which the lock has been granted, and the range of the corresponding object lock.

30. A program storage device as defined in claim 29, wherein the performed method step of migrating all locks for the same data object recorded in the respective client environments to the server environment includes the steps of:

determining sufficient information to reconstruct the original lock request from the client lock log;

generating the original lock request in accordance with the reconstruction information from the client lock log and sending it to the server; and storing a server lock structure in the server environment such that the server lock structure identifies the client process holding the granted lock, the data object for which the lock has been granted, and the object portion covered by the corresponding lock.

31. A program storage device as defined in claim 29, wherein the performed method step of storing a client lock structure includes the step of storing sufficient client process and data object information to support splitting the object portions covered by locks recorded in the client environment to reflect the determined queue order for the requested locks.

32. A program storage device as defined in claim 25, wherein the performed method step of migrating all locks for the same data object recorded in the respective client environments to the server environment includes the steps of:

determining sufficient information to reconstruct the original lock request from a client lock log;

generating the original lock request in accordance with the reconstruction information and sending it to the server; and storing a server lock structure in the server environment such that the server lock structure identifies the client process holding the granted lock, the data object for which the lock has been granted, and the object portion covered by the corresponding lock.

33. A program storage device as defined in claim 32, wherein the performed method steps further include the step of deleting the client lock log entry and the client lock structure for the migrated lock.

34. A program storage device as defined in claim 32, wherein the performed method steps further include the steps of:

determining if a predetermined client resource limit has been reached that prevents the local recording of a lock in the client environment;

responding to the lock request of the first client process, if it is determined that the predetermined client resource limit has been reached, by migrating all locks recorded in the client environment to the server environment.

35. A program storage device as defined in claim 34, wherein the performed method step of migrating all locks in the client environment to the server environment includes the steps of:

determining sufficient information to reconstruct the original lock request from a client lock data structure;

generating the original lock request in accordance with the reconstruction information and sending it to the server; and storing a server lock structure in the server environment such that the server lock structure identifies the client process holding the granted lock, the data object for which the lock has been granted, and the object portion covered by the corresponding lock.

36. A program storage device as defined in claim 32, wherein the first received client process lock request includes data that specifies whether the client process desires to wait for a requested lock if it cannot be granted immediately, and the step of determining if the object portion covered by the requested lock overlaps the object portion covered by another lock and placing all lock requests for the same data object in contention for the lock request is executed only if the received request specifies that the client desires to wait for a requested lock.

* * * * *